US012732021B2

(12) United States Patent
Forrester et al.

(10) Patent No.: US 12,732,021 B2
(45) Date of Patent: Sep. 8, 2026

(54) INDUCTIVE CHARGING CASE

(71) Applicant: Cochlear Limited, Macquarie University (AU)

(72) Inventors: Kurt Forrester, Bangor (AU); Nathan Isaacson, Balgowlah (AU); Peter Sprada, Croydon (AU); Peter Russell, Regentville (AU)

(73) Assignee: Cochlear Limited, Macquarie University (AU)

( * ) Notice: Subject to any disclaimer, the term of this patent is extended or adjusted under 35 U.S.C. 154(b) by 845 days.

(21) Appl. No.: 17/921,272

(22) PCT Filed: Mar. 30, 2021

(86) PCT No.: PCT/IB2021/052632
§ 371 (c)(1),
(2) Date: Oct. 25, 2022

(87) PCT Pub. No.: WO2021/220077
PCT Pub. Date: Nov. 4, 2021

(65) Prior Publication Data

US 2023/0208193 A1 Jun. 29, 2023

Related U.S. Application Data

(60) Provisional application No. 63/017,206, filed on Apr. 29, 2020.

(51) Int. Cl.
*H02J 50/10* (2016.01)
*H02J 7/70* (2026.01)
(Continued)

(52) U.S. Cl.
CPC .............. *H02J 50/10* (2016.02); *H02J 7/731* (2026.01); *H02J 50/90* (2016.02); *H04R 25/55* (2013.01);
(Continued)

(58) Field of Classification Search
CPC .......... H02J 50/10; H02J 7/0044; H02J 50/90; H04R 2225/31; H04R 2225/021; A45C 11/001
See application file for complete search history.

(56) References Cited

U.S. PATENT DOCUMENTS 4,379,988 A * 4/1983 Mattatall ................. H02J 50/90 320/108
6,310,960 B1 * 10/2001 Saaski ............... H01M 10/0431 381/328
(Continued)

FOREIGN PATENT DOCUMENTS

CN 205365869 U 7/2016
CN 106559721 A 4/2017
(Continued)

OTHER PUBLICATIONS

Extended European Search Report in counterpart European Application No. 21795369.4, mailed Jan. 28, 2025, 11 pages.
(Continued)

*Primary Examiner* — Jared Fureman
(74) *Attorney, Agent, or Firm* — Edell, Shapiro & Finnan, LLC

(57) ABSTRACT

An inductive charging case in accordance with certain embodiments presented herein comprises a base and a lid mechanically coupled together via a hinge mechanism. When the inductive charging case is in a closed arrangement (e.g., the lid is positioned adjacent to the base), the lid and base collectively define an interior volume that is configured to enclose an electronic device therein. The electronic device includes one or more rechargeable batteries, a receiver coil, and circuitry for recharging the one or more rechargeable batteries, while the inductive charging case includes inductive charging circuitry, including at least one inductive charging coil, that is configured to provide power to the
(Continued)

electronic device which is then used to charge the one or more rechargeable batteries and/or power the electronic device.

30 Claims, 17 Drawing Sheets

(51) Int. Cl.
*H02J 50/90* (2016.01)
*H04R 25/00* (2006.01)

(52) U.S. Cl.
CPC ..... *H04R 25/602* (2013.01); *H04R 2225/021* (2013.01); *H04R 2225/31* (2013.01); *H04R 2225/67* (2013.01)

(56) References Cited

U.S. PATENT DOCUMENTS 6,658,124 B1 * 12/2003 Meadows .............. H04R 25/55 381/328
7,620,195 B2 * 11/2009 Bengtsson ........... H04R 25/305 381/322
9,018,904 B2 4/2015 Seyerle et al.
9,060,233 B2 * 6/2015 Shennib ................. H04R 25/00
9,769,558 B2 * 9/2017 Chandramohan ..... H02J 7/0044
10,027,150 B2 7/2018 Kvols
10,218,223 B2 * 2/2019 Hatanaka .............. H02J 7/0044
10,425,751 B2 * 9/2019 Meskens .................. H04B 5/79
10,555,092 B2 * 2/2020 Hatanaka ................ H02J 50/10
10,659,859 B2 * 5/2020 Solum .................. H04R 1/1025
10,659,864 B2 * 5/2020 Lo ......................... H02J 7/0047
10,701,472 B1 * 6/2020 Xu ........................ H02J 7/0044
10,714,962 B2 * 7/2020 Vu .......................... H01F 27/02
10,750,268 B2 * 8/2020 Dang ...................... H02J 50/05
10,866,290 B2 * 12/2020 Ding ........................ H02J 50/10
11,051,095 B2 * 6/2021 Cramer ................ H04R 1/1025
11,172,101 B1 * 11/2021 Boozer .................. H04N 23/57
11,202,157 B2 * 12/2021 Nielsen ................ H04R 25/652
11,239,681 B2 * 2/2022 Johansen ............. H04R 25/602
11,399,227 B2 * 7/2022 Onizuka ................. H02J 50/10
11,458,315 B2 * 10/2022 Brehm ............... A61N 1/36036
11,575,278 B2 * 2/2023 Zhao ..................... H02J 50/402
11,637,343 B2 * 4/2023 Kukla ..................... H02J 50/12 320/101
11,792,585 B2 * 10/2023 Nielsen .................. H04R 25/60 381/323
11,838,714 B1 * 12/2023 Sjoeroos ................. H02J 50/10
11,997,444 B2 * 5/2024 Georgiades ............. H02J 7/342
2015/0256021 A1 9/2015 Kwon et al.
2017/0157408 A1 6/2017 Meskens
2018/0123367 A1 * 5/2018 Higgins ............. H01R 13/2414
2018/0190420 A1 7/2018 Tsai et al.
2019/0089187 A1 * 3/2019 Konomi .................. H01F 38/14
2019/0208342 A1 * 7/2019 Higgins ............... H04R 25/602
2019/0230456 A1 * 7/2019 Walsh .................. H04R 25/556
2019/0297437 A1 * 9/2019 Gil .......................... F26B 9/003
2019/0335868 A1 11/2019 Brzezinski et al.
2020/0091755 A1 3/2020 Larsson et al.
2020/0101886 A1 4/2020 Shibata et al.
2020/0185968 A1 * 6/2020 Kim ........................ H02J 50/12
2020/0260176 A1 * 8/2020 Baltensperger ........ H04R 25/55
2020/0366999 A1 * 11/2020 Ayache ..................... A61L 2/10
2021/0168537 A1 * 6/2021 Nielsen ................ H04R 25/554
2021/0290808 A1 * 9/2021 Schumaier ............ H02J 7/0044
2022/0376530 A1 * 11/2022 Bluhme ................. A45C 11/00

FOREIGN PATENT DOCUMENTS

| | | | | | |
|---|---|---|---|---|---|
| CN | 206744790 U | | 12/2017 | | |
| CN | 207304170 U | | 5/2018 | | |
| CN | 207559630 U | | 6/2018 | | |
| CN | 108272201 A | | 7/2018 | | |
| CN | 207819517 U | | 9/2018 | | |
| CN | 108835820 A | | 11/2018 | | |
| CN | 208257473 U | | 12/2018 | | |
| CN | 210430946 U | | 4/2020 | | |
| JP | 2009267582 A | * | 11/2009 | | |
| SE | 1750283 A1 | | 9/2018 | | |
| WO | WO-2012077088 A2 | * | 6/2012 | .......... | H02J 7/00034 |

OTHER PUBLICATIONS

International Search Report and Written Opinion in counterpart International Application No. PCT/IB2021/052632, mailed Jul. 6, 2021, 13 pages.

* cited by examiner

COCHLEAR IMPLANT SYSTEM 102
EXTERNAL COMPONENT 104
SOUND PROCESSING UNIT 106
115 SKIN/TISSUE
113
118
122
108
SOUND INPUT DEVICE(S)
COMMUNICATION AND CHARGING CIRCUIT
AUXILIARY INPUT DEVICE(S)
RECHARGEABLE BATTERY
123
119
WIRELESS TRANSCEIVER
120
124
129
PROCESSOR(S)
125
128
126
MEMORY
SOUND PROCESSING LOGIC
127
121
105
IMPLANTABLE COIL 114
138
134
146
140
142
144
RF INTERFACE CIRCUITRY
N
STIMULATOR UNIT
116
136
112 IMPLANTABLE COMPONENT

INDUCTIVE CHARGING CASE 250
264 INSERT
284 OPENING
279
276
274
272 POSITIONING ARRANGEMENT
275
270 FAN
258 UPPER OPENING
254 BASE
282
282
257 OUTER SHELL
259 INTERIOR VOLUME
262 ELECTRICAL COMPONENTS
256 SPRING-LOADED HINGE MECHANISM
255 INNER SHELL
LID 252
253 OUTER SHELL
258 WINDOW
260 CASE COIL

452
LID
460
471
467
456
SPRING-LOADED
HINGE MECHANISM
389
308
329
468
464
INSERT
321
323
307
CABLE
306
BTE SOUND
PROCESSING
UNIT
466
DEVICE
RECESS
461
468

452
LID
458
WINDOW
306
BTE SOUND
PROCESSING
UNIT
308
389
460
321
323
461
461
307
CABLE 389
308
460
329
452
LID
464
INSERT
482
387
327
454
BASE
306
BTE SOUND
PROCESSING UNIT
470
FAN

552
LID
327
556
SPRING-LOADED
HINGE MECHANISM
513
329
389
308
584
306
BTE SOUND
PROCESSING
UNIT
564
INSERT
561
566
DEVICE
RECESS
307
CABLE
468
461

552
LID
308
561
307
CABLE
558
WINDOW
327
561
306
BTE SOUND
PROCESSING
UNIT
560
329

582
552
LID
321
306
BTE SOUND
PROCESSING UNIT
560
554
BASE
570
FAN

FIG. 6

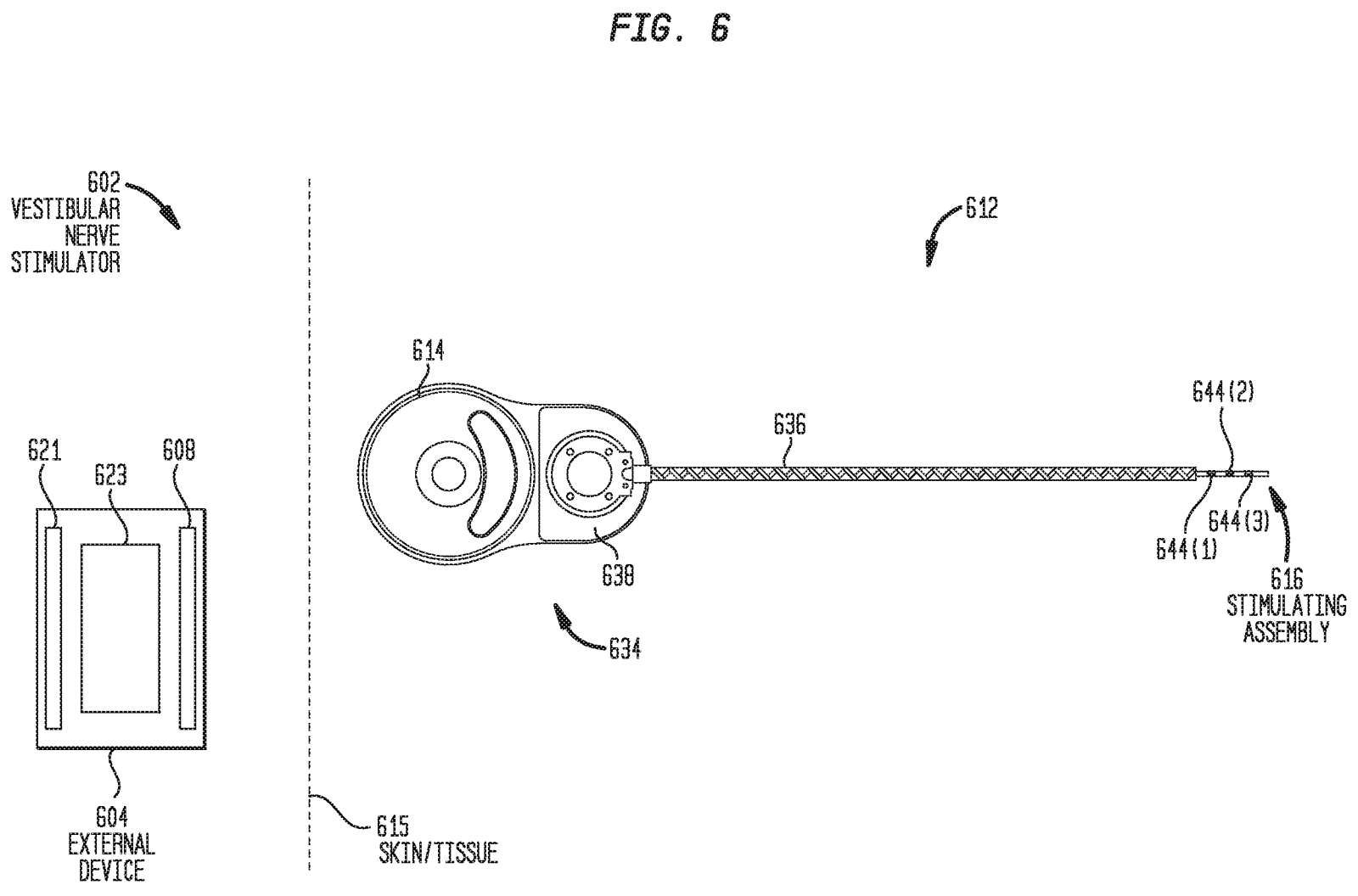

616 STIMULATING ASSEMBLY
644(2)
644(3)
644(1)
612
636
638
634
614
615 SKIN/TISSUE
602 VESTIBULAR NERVE STIMULATOR
608
623
621
604 EXTERNAL DEVICE

INDUCTIVE CHARGING CASE

BACKGROUND

Field of the Invention

The present invention relates generally to an inductive charging case for an electronic device, such as an external component of an implantable medical device.

Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect, an inductive charging case is provided. The inductive charging case comprises: a base; a lid attached to the base via a hinge mechanism, wherein in a closed arrangement the lid and base collectively define an interior volume configured to enclose an electronic device therein; and an inductive case coil disposed in the lid, wherein the inductive case coil is configured for inductive coupling with a charging coil in the electronic device.

In another aspect, an inductive charging case is provided. The inductive charging case comprises: a base comprising a concave outer shell defining an upper opening; a lid attached to the base via a hinge mechanism and configured to close the upper opening; an insert disposed in the upper opening of the base, wherein the insert comprises a device recess configured to receive an electronic device therein; and a positioning arrangement configured to enable movement of the electronic device relative to the insert along an axis that is generally orthogonal to the upper opening.

In another aspect, an inductive charging case is provided. The inductive charging case comprises: a base; an articulable lid mechanically coupled to the base, wherein the lid and base collectively form an interior volume configured to enclose an electronic device therein, wherein the electronic device comprises at least one rechargeable battery and an inductive charger coil; inductive charging circuitry configured to inductive charge the at least one rechargeable battery of the electronic device; and a fan configured to draw air from outside of the inductive charging case into an interior of the inductive charging case and to expel air from the interior of the inductive charging case to outside of the inductive charging case.

In another aspect, a method for inductively charging a sound processing unit of an auditory prosthesis with an inductive charging case is provided. The inductive charging case comprises a base and a lid attached to the base via hinge mechanism, and the method comprises: detaching the sound processing unit from a head of a recipient of the auditory prosthesis, wherein the sound processing unit comprises a skin-facing surface and an outer-facing surface; placing the sound processing unit in the inductive charging case with the skin-facing surface facing a bottom surface of the base; and closing the lid to enclose the sound processing unit inside the inductive charging case.

In another aspect, an inductive charging case is provided. The inductive charging case comprises: a base; an articulable lid mechanically coupled to the base via a hinge mechanism, wherein the lid and base collectively form an interior volume configured to enclose an electronic device therein, wherein the electronic device comprises at least one rechargeable battery and an inductive charger coil; inductive charging circuitry configured to inductively charge the at least one rechargeable battery of the electronic device; an insert positioned in the base, wherein the insert comprises a profiled device recess configured to receive the electronic device therein, wherein the profiled device recess comprises a central region having a shape corresponding to a shape of the electronic device, and one or more finger scoops adjacent to, and extending from, the central region; a positioning arrangement configured to enable movement of the electronic device relative to the insert along an axis that is generally orthogonal to the lid, wherein the positioning arrangement comprises a moveable support member forming a bottom surface of at least a portion of the profiled device recess and one or more springs extending from the support member to a surface of the base; and a fan configured to draw air from outside of the inductive charging case into an interior of the inductive charging case and to expel air from the interior of the inductive charging case to outside of the inductive charging case, wherein base includes a plurality of openings, and wherein the fan is configured to draw air from outside of the inductive charging into the interior of the inductive charging case via the plurality of openings in the base, and wherein the fan is configured to expel air from the interior of the inductive charging case to outside of the inductive charging case via a seam between the lid and the base.

BRIEF DESCRIPTION OF THE DRAWINGS

Embodiments of the present invention are described herein in conjunction with the accompanying drawings, in which:

FIGS. 21 and 2J are schematic cross-sectional views of the inductive charging case of FIG. 2A, where the inductive charging case is shown in the closed arrangement;

FIG. 6 is a schematic diagram illustrating a vestibular implant having an external component that can be charged with an inductive charging case, in accordance with certain embodiments presented herein;

DETAILED DESCRIPTION

Figure 1A:
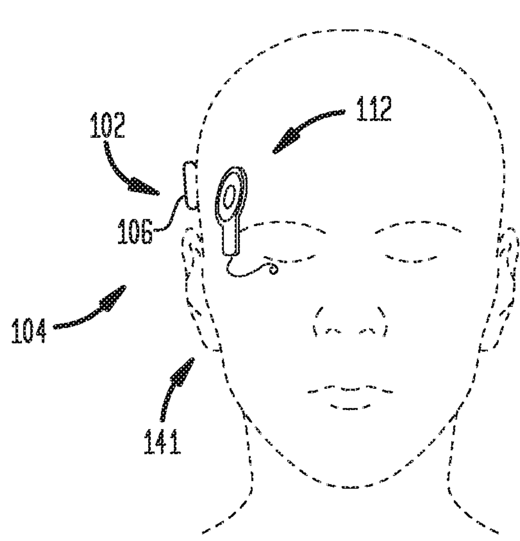
FIG. 1A is a schematic diagram illustrating a cochlear implant system having an external component that can be charged with an inductive charging case, in accordance with certain embodiments presented herein.

Presented herein are inductive charging cases for inductively charging rechargeable batteries integrated in electronic devices. An inductive charging case in accordance with certain embodiments presented herein comprises a base and a lid mechanically coupled together via a hinge mechanism. When the inductive charging case is in a closed arrangement (e.g., the lid is positioned adjacent to the base), the lid and base collectively define an interior volume that is configured to enclose an electronic device therein. The electronic device includes one or more rechargeable batteries, a receiver coil, and circuitry for recharging the one or more rechargeable batteries, while the inductive charging case includes inductive charging circuitry, including at least one inductive charging coil, that is configured to provide power to the electronic device which is then used to charge the one or more rechargeable batteries and/or power the electronic device.

Merely for ease of description, embodiments are described herein with reference to the "inductive charging" of an electronic device, such as an auditory prosthesis sound processing unit. As used herein, reference to "inductive charging" of an electronic device refers to a process in which the electronic device is wirelessly provided with power for use by the electronic device to "charge" one or more rechargeable batteries disposed/positioned in (e.g., integrated within) the electronic device. That is, as described further below, an electronic device includes or more rechargeable batteries, a receiver coil, and circuitry for recharging the one or more rechargeable batteries, while the inductive charging case includes inductive charging circuitry, including at least one inductive charging coil, that is configured to provide power to the electronic device which is then used to charge the one or more rechargeable batteries and/or power the electronic device In certain examples, an inductive charging case presented herein comprises an inductive charging coil disposed/positioned in the lid of the case. As described further below, the provision of the inductive charging coil in the lid accommodates an auditory prosthesis sound processing unit, which has a top-side charging coil, into the charger with the top-side charging coil facing the lid. This enables the sound processing unit to maintain a uniform orientation when moved from the head of the recipient to the interior of the inductive charging case for recharging (i.e., with the sound processing unit resting in the case with the bottom-side or skin-facing side of the sound processing unit, facing a bottom of the case), and vice versa. Such a uniform orientation has been found to provide a significant usability benefit for those who lack manual dexterity or who merely want things to be as easy and simple as possible.

In certain examples, an inductive charging case presented herein comprises a transparent window in the lid of the case so that a charging status indicator (e.g., Light Emitting Diode (LED)) of an auditory prosthesis sound processing unit can be viewed through the window while the sound processing unit is being charged (e.g., when the lid is closed and the sound processing unit is enclosed in the inductive charging case). The provision of the transparent window in the lid may, in certain examples, dispense with the need to have a separate charging indicator on the in the inductive charging case itself.

In certain examples, an interior of the base of an inductive charging case presented herein may include a ferromagnetic metal insert/component (e.g., ferromagnetic metal, a permanent magnet, etc.) configured to magnetically attract to a magnet in an auditory prosthesis sound processing unit. The ferromagnetic metal component can be configured such that the magnetic coupling strength between the ferromagnetic metal component and the magnet in the sound processing unit is sufficient to override a magnetic attraction of the sound processing unit to ferrite material of a charging coil in the lid of the inductive charging case. That is, the magnetic coupling strength between the ferromagnetic metal component and the magnet in the sound processing unit is configured to ensure that the sound processing unit does not attract to the lid when it is opened, but not so strong that a sound processing unit with a strong magnet cannot be removed by weaker users.

Inductive charging cases presented herein are configured to enclose electronic devices therein and inductive charge those electronic devices. In certain examples, the inductive charging operations can be combined with "drying" operations that are designed to remove moisture from electronic device. In particular, as described further below, the inductive charging process generates residual heat that assists with removing moisture from, for example, circuitry and other components in the electronic device. However, these operations create moist air within the interior of the inductive charging case and the heat from the inductive charging process could damage or harm the rechargeable battery/batteries or other internal components in the electronic device. As such, inductive charging cases presented herein can include a fan to expel heat generated by the inductive charging process to improve battery life due to the harmful effects of heat on the battery. The fan is also configured circulate dry air into the inductive charging case, while expelling the moist air out of the interior of the case to further enhance drying of the electronic device.

In certain examples, inductive charging cases presented herein can include an insert in the base that includes a device recess configured to receive an electronic device therein. The insert may also include scoops adjacent to, and extending from, the device recess for assisting in the insertion/removal of the electronic device from the inductive charging case. In addition, the base may also include a positioning arrangement configured to enable movement of the electronic device relative to the insert along an axis that is generally orthogonal to the lid (e.g., orthogonal to a primary inner surface of the lid or a plane of a coil within the lid). For example, a positioning arrangement may enable an inductive charging case to accommodate an auditory prosthesis sound processing unit with or without a spacer fitted so that the sound processing unit is positioned close to the lid. Such positioning allows for optimal inductive coupling and optimal charging efficiency, where the lid includes the inductive charging coil.

In certain embodiments, the lid of an inductive charging case is coupled to the base via a spring-loaded hinge mechanism that is configured to "spring" or "automatically" force close the lid, which removes the need for the user to fully close the lid manually and ensures that the user is not relied upon to fully close the lid. The spring-loaded hinge mechanism provides sufficient force to depress the positioning arrangement (if present) by pressing down on the electronic device (e.g., auditory prosthesis sound processing unit, regardless of whether or not a spacer (e.g., used to increase separate between the processor and the skin) is fitted to the sound processing unit). However, the closed/retention strength of the spring-loaded hinge mechanism is such that the lid can be easily opened by weaker users.

Merely for ease of description, the techniques presented herein are primarily described herein with reference to external component of a specific type of auditory prosthesis system, namely external components of a cochlear implant system. However, it is to be appreciated that the inductive charging cases presented herein may also be used to charge a variety of other types of electronic devices, including external components of other types of implantable medical devices. For example, the inductive charging cases herein may be used with external components of other auditory prostheses, such as middle ear auditory prostheses, bone conduction devices, direct acoustic stimulators, electro-acoustic prostheses, auditory brain stimulators, etc. The techniques presented herein may also be used with tinnitus therapy devices, vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc. Moreover, it is to be appreciated that the inductive charging cases present herein could be used to charge any electronic device having an inductive charging coil, including electronic devices that are not part of an implantable medical device (e.g., wireless headphones or wireless ear-buds, wearable devices, such as activity trackers, watches, blood pressure sensors, etc., handheld or other devices, etc.).

Figure 1B:
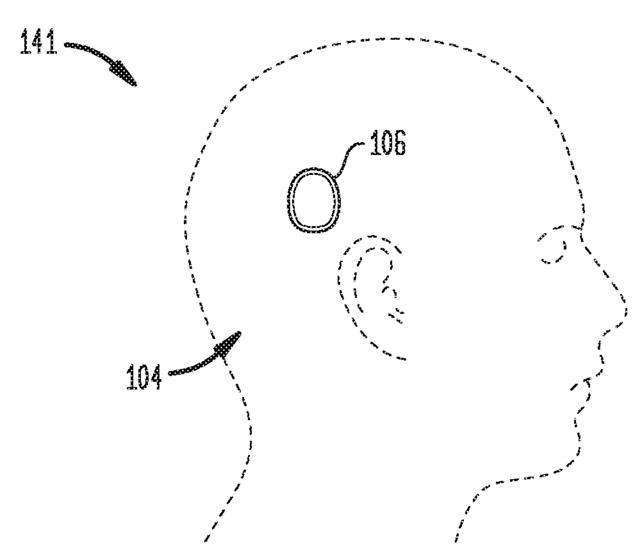
FIG. 1B is a side view of a recipient wearing the cochlear implant system of FIG. 1A.
Figure 1C:
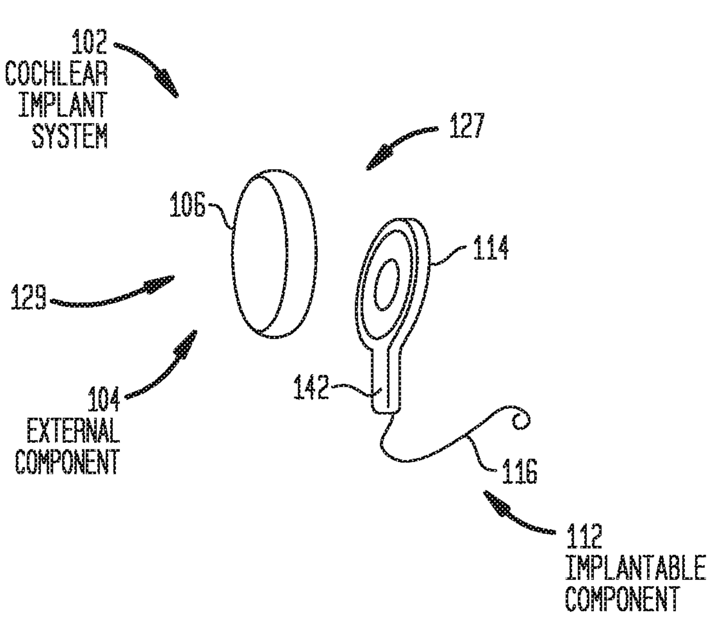
FIG. 1C is a schematic view of the components of the cochlear implant system of FIG. 1A.
Figure 1D:
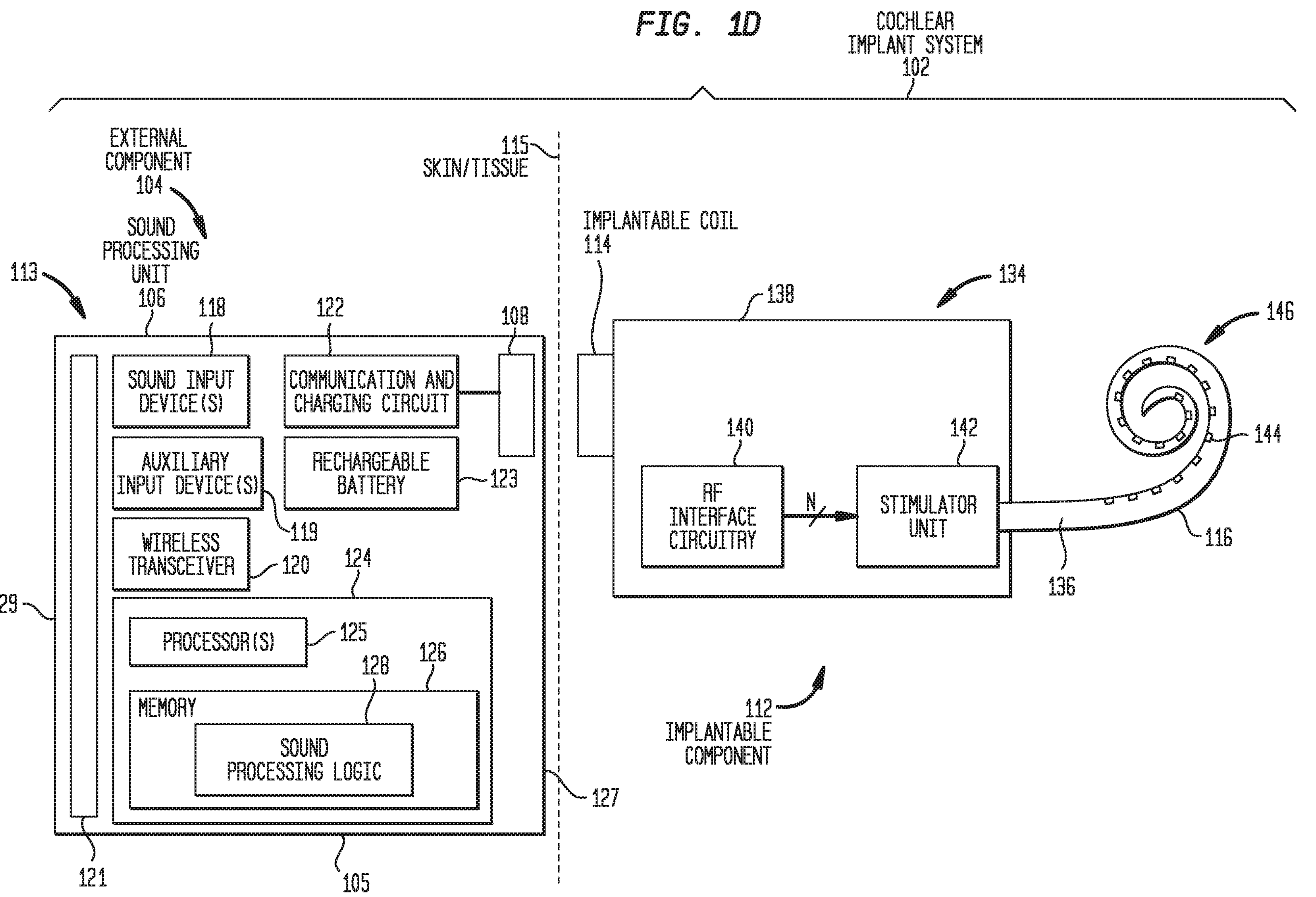
FIG. 1D is a block diagram of the sound processing unit forming part of the cochlear implant system of FIG. 1A.

FIGS. 1A-1D are diagrams illustrating an example cochlear implant system 102 having an external device/component 104 that may be inductively charged by an inductive charging case in accordance with certain embodiments presented herein. In addition to the external component 104, the cochlear implant system 102 also comprises an implantable component 112. FIG. 1A is a schematic diagram illustrating the implantable component 112 implanted in the head 141 of a recipient, while FIG. 1B is schematic drawing of the external component 104 worn on the head 141 of the recipient. FIG. 1C is another schematic view of the cochlear implant system 102, while FIG. 1D is a block diagram illustrating further details of the cochlear implant system 102. For ease of description, FIGS. 1A-1D will generally be described together.

As noted, cochlear implant system 102 includes an external component 104 that is configured to be directly or indirectly attached to the body of the recipient and an implantable component 112 (cochlear implant) configured to be implanted in the recipient. In the examples of FIGS. 1A-1D, the external component 104 comprises a sound processing unit 106, while the implantable component 112 includes an internal coil 114, a stimulator unit 142 and an elongate stimulating assembly (electrode array) 116 implanted in the recipient's cochlea.

In the example of FIGS. 1A-1D, the sound processing unit 106 is an off-the-ear (OTE) sound processing unit, sometimes referred to herein as an OTE component, that is configured to send data and power to the implantable component 112. In general, an OTE sound processing unit is a component having a generally cylindrically shaped housing 105 and which is configured to be magnetically coupled to the recipient's head (e.g., includes an integrated magnet configured to be magnetically coupled to a magnet in the implantable component 112). The OTE sound processing unit 106 also includes an integrated external coil 108 that is configured to be inductively coupled to the implantable coil 114.

It is to be appreciated that the OTE sound processing unit 106 is merely illustrative of the external devices that could operate with implantable component 112. For example, in alternative examples, the external component may comprise a behind-the-ear (BTE) sound processing unit or a micro-BTE sound processing unit and a separate external. In general, a BTE sound processing unit comprises a housing that is shaped to be worn on the outer ear of the recipient and is connected to the separate external coil via a cable assembly (cable), where the external coil is configured to be inductively coupled to the implantable coil 114. It is also to be appreciated that alternative external components could be located in the recipient's ear canal, worn on the body, etc.

Referring to the specific example of FIGS. 1A-1D, FIG. 1D illustrates that the OTE sound processing unit 106 comprises one or more input devices 113 that are configured to receive input signals (e.g., sound or data signals). The one or more input devices 113 include one or more sound input devices 118 (e.g., microphones, audio input ports, telecoils, etc.), one or more auxiliary input devices 119 (e.g., audio ports, such as a Direct Audio Input (DAI), data ports, such as a Universal Serial Bus (USB) port, cable port, etc.), and a wireless transmitter/receiver (transceiver) 120. However, it is to be appreciated that one or more input devices 113 may include additional types of input devices and/or less input devices (e.g., the wireless transceiver 120 and/or one or more auxiliary input devices 119 could be omitted).

The OTE sound processing unit 106 also comprises the external coil 108, a charging coil 121, communication and charging circuitry 122, at least one rechargeable battery 123, and a processing module 124. The processing module 124 comprises one or more processors 125 and a memory 126 that includes sound processing logic 128. The communication and charging circuitry 122 includes, for example, a closely-coupled transmitter/receiver (transceiver) 122, sometimes referred to as or radio-frequency (RF) transceiver 122, and circuitry for recharging the at least one rechargeable battery 123.

The implantable component 112 comprises an implant body (main module) 134, a lead region 136, and the intra-cochlear stimulating assembly 116, all configured to be implanted under the skin/tissue (tissue) 115 of the recipient. The implant body 134 generally comprises a hermetically-sealed housing 138 in which RF interface circuitry 140 and a stimulator unit 142 are disposed. The implant body 134 also includes the internal/implantable coil 114 that is generally external to the housing 138, but which is connected to the transceiver 140 via a hermetic feedthrough (not shown in FIG. 1D).

As noted, stimulating assembly 116 is configured to be at least partially implanted in the recipient's cochlea. Stimulating assembly 116 includes a plurality of longitudinally spaced intra-cochlear electrical stimulating contacts (electrodes) 144 that collectively form a contact or electrode array 146 for delivery of electrical stimulation (current) to the recipient's cochlea. As noted above, description with reference to cochlear implant system 102 is merely illustrate and inductive charging cases presented herein may be used with a wide variety of electronic devices.

Stimulating assembly 116 extends through an opening in the recipient's cochlea (e.g., cochleostomy, the round window, etc.) and has a proximal end connected to stimulator unit 142 via lead region 136 and a hermetic feedthrough (not shown in FIG. 1D). Lead region 136 includes a plurality of conductors (wires) that electrically couple the electrodes 144 to the stimulator unit 142.

As noted, the cochlear implant system 102 includes the external coil 108 and the implantable coil 114. The coils 108 and 114 are typically wire antenna coils each comprised of multiple turns of electrically insulated single-strand or multi-strand platinum or gold wire. Generally, a magnet is fixed relative to each of the external coil 108 and the implantable coil 114. The magnets fixed relative to the external coil 108 and the implantable coil 114 facilitate the operational alignment of the external coil 108 with the implantable coil 114. This operational alignment of the coils enables the external component 104 to transmit data and power to the implantable component 112 via a closely-coupled wireless link formed between the external coil 108 and the implantable coil 114. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 1D illustrates only one example arrangement.

In the example of FIGS. 1A-1D, the external coil 108 is located adjacent to a skin-facing surface or bottom-side 127 of the housing 105 of the sound processing unit 106. However, the charging coil 121 is located adjacent to an outer-facing surface or top-side 129 of the housing 105. As such, the external coil 108 is sometimes referred to as a "bottom-side implant transmission coil" or a "bottom-side coil," while the charging coil 121 is sometimes referred to as a "top-side charging coil" or a "top-side coil."

As noted above, sound processing unit 106 includes the processing module 124. The processing module 124 is configured to convert received input signals (received at one or more of the input devices 113) into output signals 145 for use in stimulating a first ear of a recipient (i.e., the processing module 124 is configured to perform sound processing on input signals received at the sound processing unit 106). Stated differently, in the sound processing mode, the one or more processors 125 are configured to execute binaural sound processing logic 128 in memory 126 to convert the received input signals into output signals 145 that represent electrical stimulation for delivery to the recipient.

In the embodiment of FIG. 1D, the output signals 145 are provided to the RF transceiver 114, which transcutaneously transfers the output signals 145 (e.g., in an encoded manner) to the implantable component 112 via external coil 108 and implantable coil 114. That is, the output signals 145 are received at the RF interface circuitry 140 via implantable coil 114 and provided to the stimulator unit 142. The stimulator unit 142 is configured to utilize the output signals 145 to generate electrical stimulation signals (e.g., current signals) for delivery to the recipient's cochlea via one or more stimulating contacts 144. In this way, cochlear implant system 102 electrically stimulates the recipient's auditory nerve cells, bypassing absent or defective hair cells that normally transduce acoustic vibrations into neural activity, in a manner that causes the recipient to perceive one or more components of the received sound signals.

In operation, the sound processing unit 106 transcutaneously transfers power from the at least one rechargeable battery 123 to the implantable component 112 via external coil 108. The at least one rechargeable battery 123 has a finite capacity (run-time) and, as such, needs to be recharged periodically (e.g., every day, every few days, etc.). However, the at least one rechargeable battery 123 may be integrated into the sound processing unit 106 such that it cannot be removed for these recharging operations (inbuilt rechargeable battery). Accordingly, the OTE sound processing unit 106 includes the charging coil 121 that is used to inductively receive power for use in recharging the at least one rechargeable battery 123.

Presented herein are inductive charging devices, sometimes referred to as "inductive charging cases" or "inductive chargers," that are configured to provide inductive charging of electronic devices having one or more integrated rechargeable batteries, such as the OTE sound processing unit 106. Inductive charging case in accordance with embodiments presented herein generally include a base and a lid that collectively form an interior volume that is configured to substantially enclose/surround the OTE sound processing unit 106. In certain embodiments presented herein, the lid of an inductive charging case includes a charging coil configured to be inductively coupled to the top-side charging coil 121 of the OTE sound processing unit 106. In certain embodiments presented herein, an inductive charging case is configured to combine charging of the OTE sound processing unit 106 with a drying operation, at least partially using residual heat from the charging process to dry the OTE sound processing unit 106. In certain embodiments presented herein, an inductive charging case includes a positioning arrangement configured to optimally position the OTE sound processing unit 106 within the inductive charging case for charging operations (e.g., position the electronic device, or part thereof, for optimal inductive coupling with a charging coil of the inductive case).

The above and other features of inductive charging cases presented herein are described in greater detail below. As noted, merely for ease of description, inductive charging cases in accordance with embodiments presented herein are primarily described with reference to an external component of an implantable medical device, namely OTE sound processing unit 106. However, as described elsewhere herein, inductive charging cases in accordance with embodiments presented herein may be used for charging a variety of other electronic devices.

FIGS. 2A-2J are diagrams illustrating details of one example inductive charging case 250, in accordance with certain embodiments presented herein. Again, merely for ease of description, the inductive charging case 250 will be described with reference to OTE sound processing unit 106. Also, for ease of description, FIGS. 2A-2J will be generally described together.

In use, the inductive charging case 250 rests on a support surface, such as a surface of a table, a dresser, a night-stand, etc. Merely for reference, aspects of the inductive charging case 250 are sometimes described with reference to relative directions, such as "top," "bottom," "upper," "lower," and the like. It is to be understood that terms such as "top," "bottom," "upper," "lower," "left," "right," "front," "rear," "side," "height," "length," "width," "interior," "exterior," "inner," "inside," "outer," "outside," are used herein, merely describe points or portions of reference and do not limit embodiments of the present invention to any particular orientation or configuration. Further, terms such as "first," "second," "third," etc., merely identify one of a number of portions, components and/or points of reference as disclosed herein, and do not limit the embodiments of the present invention to any particular configuration or orientation.

Figure 2A:
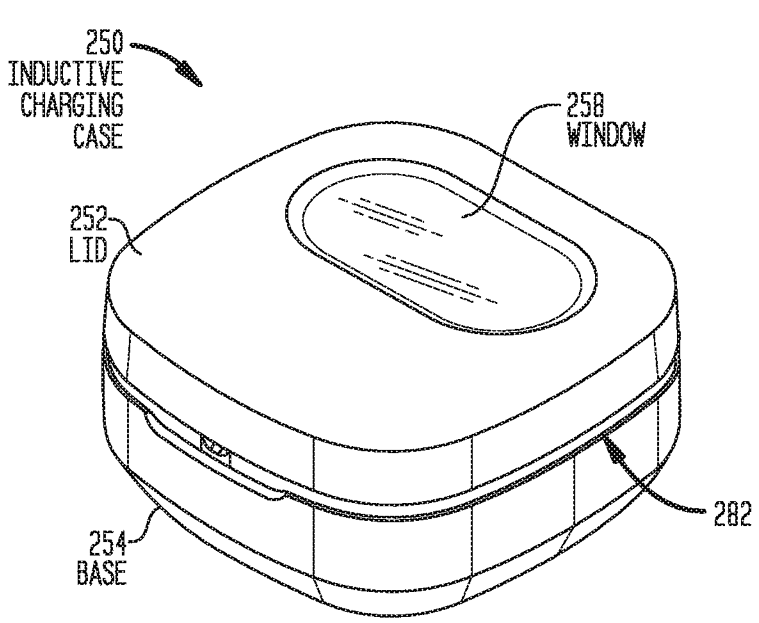
FIG. 2A is perspective view of an inductive charging case, in accordance with certain embodiments presented herein, where the inductive charging case is shown in a closed arrangement.
Figure 2B:
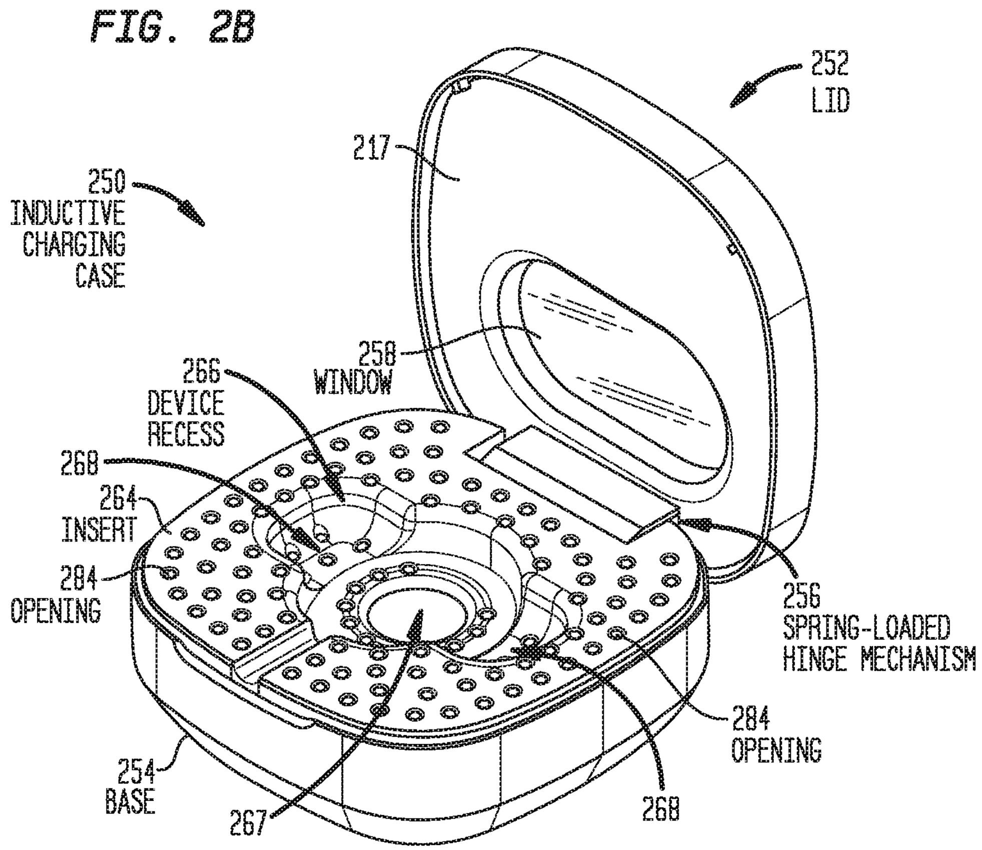
FIG. 2B is a perspective view of the inductive charging case of FIG. 2A, where the inductive charging case is shown in an open arrangement.
Figure 2C:
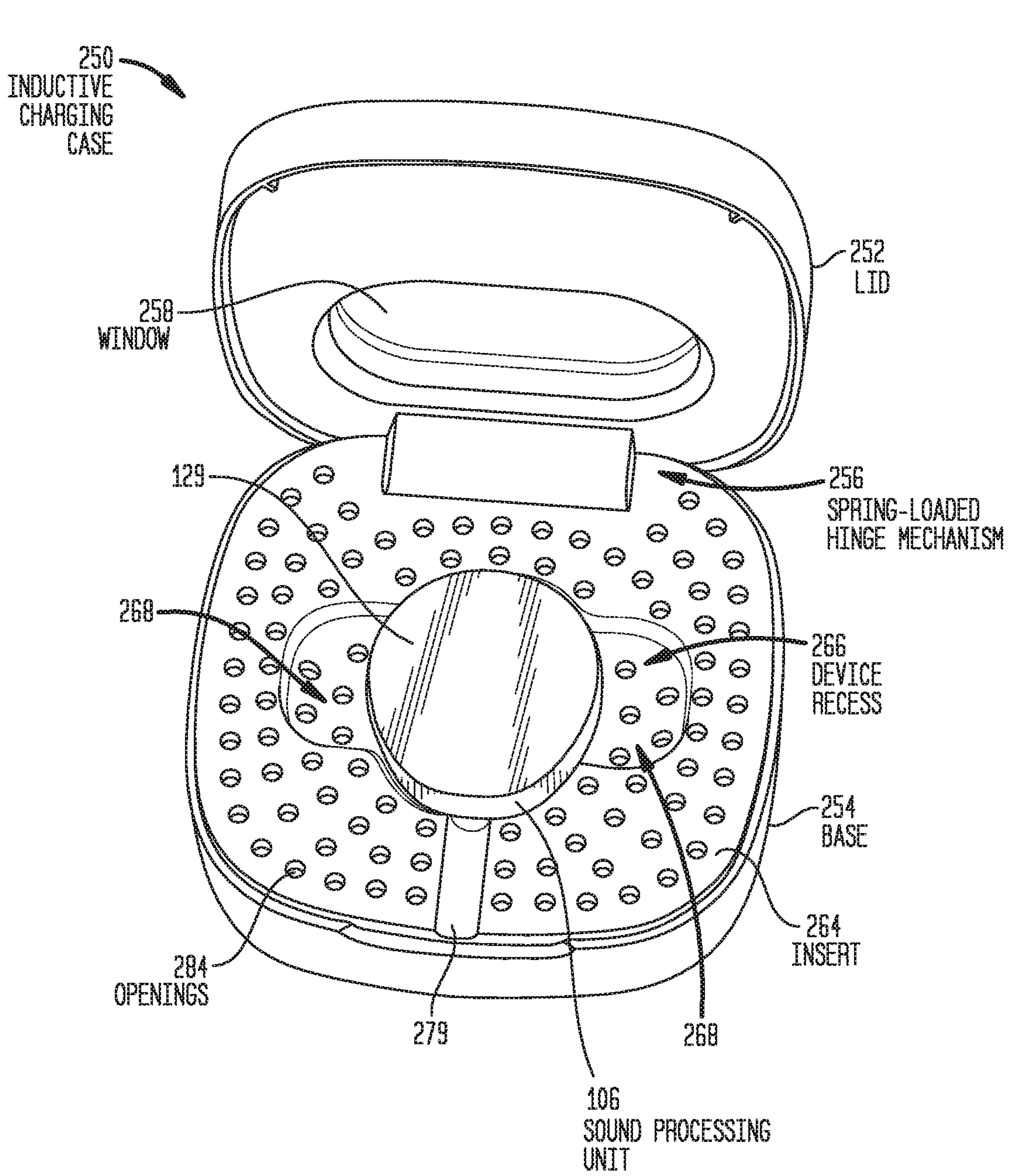
FIG. 2C is a top view of the inductive charging case of FIG. 2A, where the inductive charging case is shown in an open arrangement.
Figure 2D:
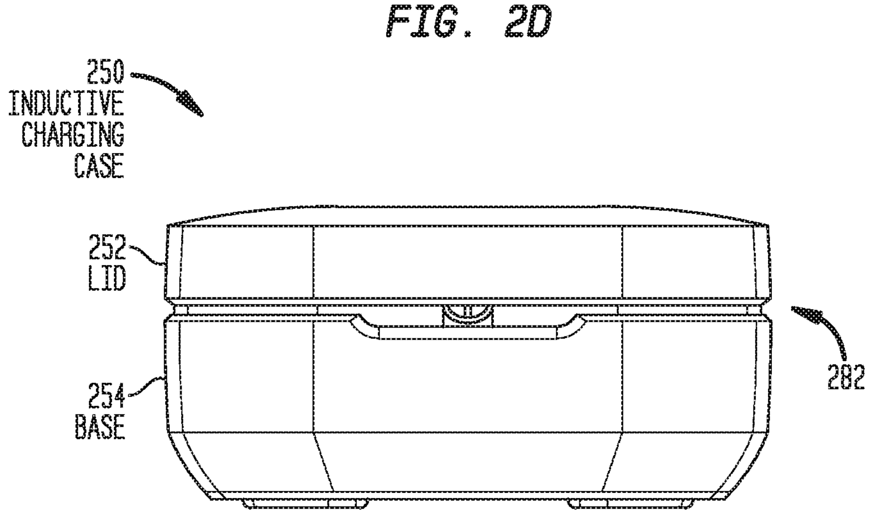
FIG. 2D is a front view of the inductive charging case of FIG. 2A, where the inductive charging case is shown in the closed arrangement.
Figure 2E:
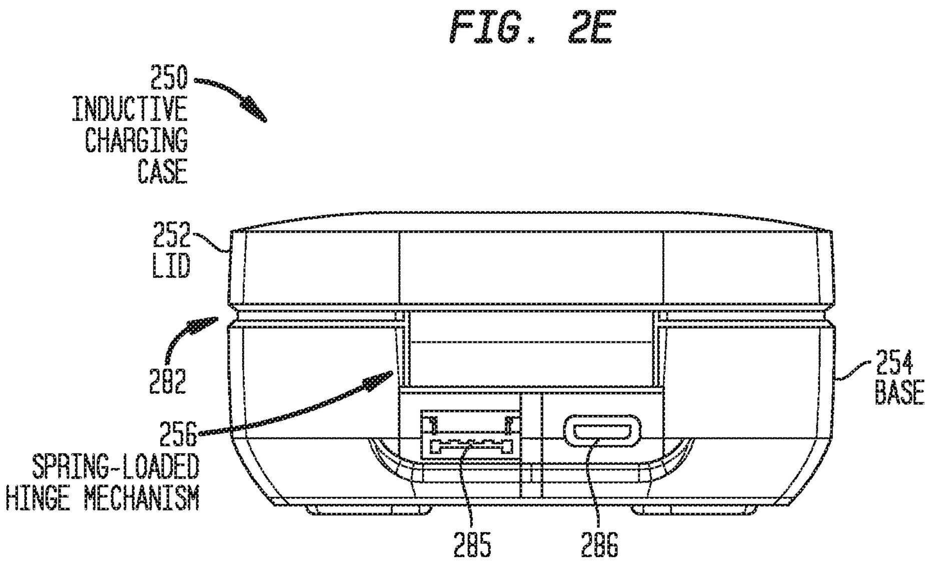
FIG. 2E is a rear view of the inductive charging case of FIG. 2A, where the inductive charging case is shown in the closed arrangement.
Figure 2F:
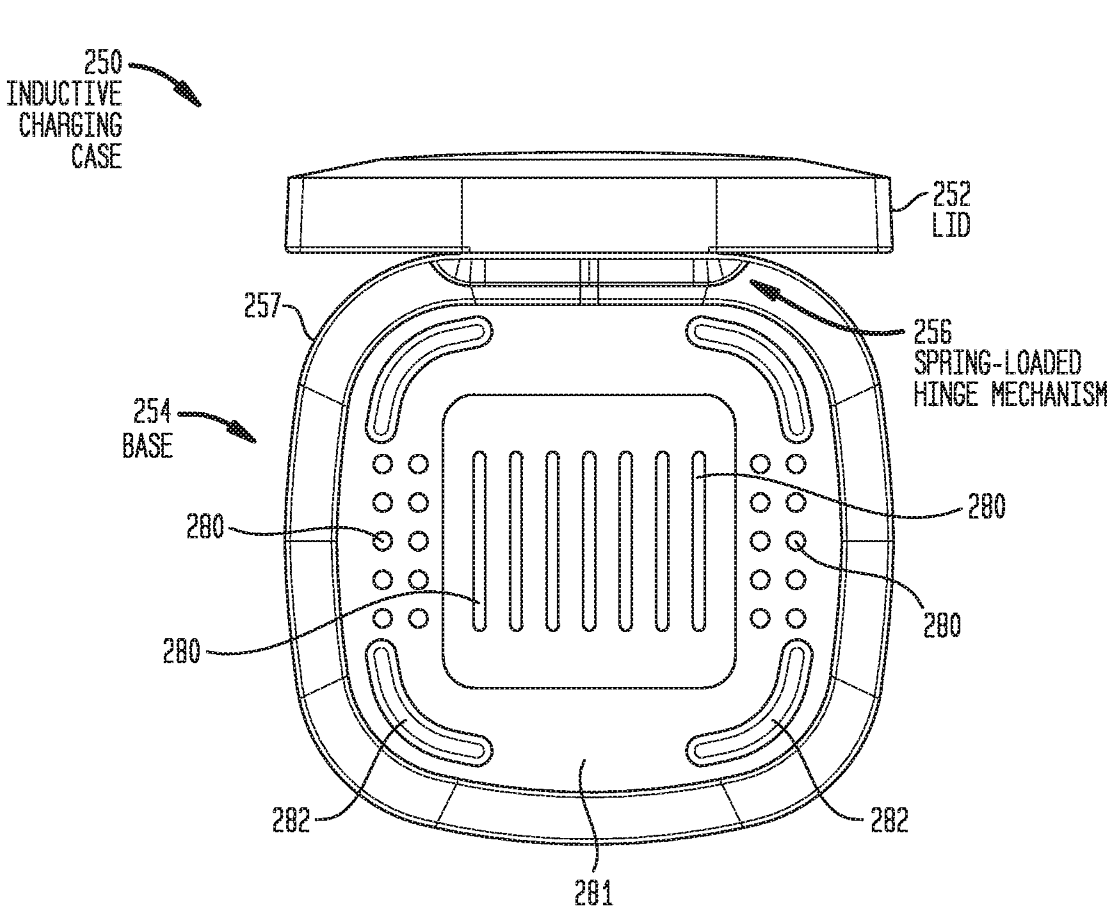
FIG. 2F is a bottom view of the inductive charging case of FIG. 2A, where the inductive charging case is shown in the open arrangement.

As shown, the inductive charging case 250 comprises an upper portion 252, sometimes referred to herein as a "lid" or "cover," that is attached to a lower portion 254, sometimes referred to herein as a "base." The lid 252 and the base 254 are mechanically coupled to one another via a hinge mechanism which, in this example, is a spring-loaded hinge mechanism 256. FIG. 2A is a perspective view of the inductive charging case 250 in a closed configuration/arrangement (i.e., with the lid 252 and the base 254 closed together), while FIG. 2B is a perspective view of the inductive charging case 250 in an open configuration/arrangement (i.e., the lid 252 is opened and separated from the base 254). FIG. 2C is a top view of the inductive charging case 250 in an open configuration, but with the sound processing unit 106 positioned in the base 254.

Merely for ease of description, the lid 252 is sometimes referred to herein as being "closed" or "open." Reference to the lid 252 being "open" refers to the inductive charging case 250 in the open arrangement (i.e., the spring-loaded hinge mechanism 256 is actuated such that the lid 252 is separated from the base 254). Reference to the lid 252 being "closed" refers to the inductive charging case 250 in the closed arrangement (i.e., the spring-loaded hinge mechanism 256 is actuated such that the lid 252 and base 254 are closed together so as to collectively form an enclosed interior volume 211). In the closed arrangement, the enclosed interior volume 211 is configured to enclose the OTE sound processing unit 106 therein.

The lid 252 of inductive charging case 250 includes a transparent window 258. The transparent window 258 has an arrangement (e.g., size, location, etc.) such that, when the lid 252 is closed, a user is able to view a charging status indicator (e.g., Light Emitting Diode (LED)) of the OTE sound processing unit 106. That is, when the OTE sound processing unit 106 is positioned in the inductive charging case 250, and the lid 252 is closed (e.g., as shown in FIG. 2A), the transparent window 258 enables the charging status indicator of the OTE sound processing unit 106 to be viewed through the window. In this way, the user can determine the charging status of the sound processing unit 106 (e.g., charging, fully charged, etc.) without opening the inductive charging case 250. This also dispenses with a need to have a separate charging status indicator on the inductive charging case 250 itself.

In addition to the transparent window 258, the lid 252 generally includes an outer shell/layer 253 and an inner shell/layer 255. Disposed between the outer shell 253 and the inner shell 255 is an inductive case coil 260 (shown in FIG. 2G). For ease of reference, the inductive case coil 260 is sometimes referred to herein as an "inductive case coil" or a "case coil."

Referring next to the base 254, the base is generally a concave outer shell 257 with an open top (upper opening) 258. The outer shell 257 defines an interior base volume 259 in which a number of components can be positioned. For example, the base 254 includes electrical components 262 (e.g., one or more printed circuit boards), which are positioned in the interior base volume 259 and which are electrically connected to the inductive case coil 260 in the lid 252. As described further below, the electrical components 262 include, among other elements, inductive charging circuitry configured to energize (drive) the inductive case coil 260 in a manner that causes the inductive case coil 260 to emit an electromagnetic field that can inductively charge the sound processing unit 106, when the sound processing unit is positioned in the inductive charging case 250. Stated differently, the inductive case coil 260 is configured to provide power to the sound processing unit 106 which is then used to charge the at least one rechargeable battery and/or power the sound processing unit 106. Also as described further below, the electrical components 262 include a fan 270.

The inductive charging case 250 also includes an insert 264 that is configured to be positioned at the upper opening 258 of the base 254. The insert 264 is configured to close the interior volume 259, and includes a profiled device recess 266. The device recess 266 includes a central region 267 having an arrangement (e.g., size, shape, etc.) to receive and retain (hold) the sound processing unit 106. In general, the primary function of the device recess 266 is to accurately align the coil 121 in the sound processing unit 106 with the inductive coil 260 in the lid 252, in order to maximize charging efficiency. As noted, the sound processing unit 106 in the example of FIGS. 1A-1D is an OTE unit having a generally cylindrical shape. As such, in this example, the central region 267 of device recess 267 also has a cylindrical shape corresponding to the shape of the sound processing unit 106.

In addition to the central region 267, the device recess 266 also comprises two cutouts or finger scoops 268 adjacent to, and extending from, central region 267. The finger scoops 268 enable a user's fingers to easily grab the sound processing unit 106 and remove it from the central region 267.

As noted above, the OTE sound processing unit 106 has a skin-facing surface (bottom-side) 127 and an outer-facing surface (top-side) 129. During normal use by a recipient, the skin-facing 127 of the OTE sound processing unit 106 is placed directly to the head of the recipient (e.g., facing the head), while the outer-facing surface 129 is exposed outwardly (e.g., facing away from the head). The device recess 266 is configured to receive the sound processing unit 106 with the skin-facing surface 127 resting downwardly (i.e., abutting the insert 264 and facing a bottom of the base), and the outer-facing surface 129 facing upwardly (i.e., facing the lid 252). Therefore, when the lid 252 is closed, the outer-facing surface 129 of the sound processing unit 106 is proximate to the lid 252. FIG. 2C illustrates the sound processing unit 106 positioned in the device recess 266, with the outer-facing surface 129 facing upwardly.

Also as noted above, the charging coil 121 within the sound processing unit 106 is located proximate to the outer-facing surface 129. Therefore, again when the lid 252 is closed, the charging coil 121 is proximate to the lid 252 and, accordingly, proximate to the inductive case coil 260 within the lid 252. This positioning (i.e., with the skin-facing surface 127 resting downwardly), enables the charging coil 121 to be inductively coupled with the inductive case coil 260 when the inductive charging case 250 is in the closed arrangement.

Stated differently, the provision of the inductive case coil 260 in the lid 252 of the inductive charging case 250, with the top-side charging coil 121 in the sound processing unit 106, allows the sound processing unit 106 to maintain a uniform orientation when moved from the head of the recipient to the interior of the inductive charging case 250 for recharging (i.e., with the processor resting in the charger on its bottom (skin-facing) side 127, which normally faces the head of a recipient during use by the recipient), and vice versa. Such a uniform orientation provides a usability benefit for those who lack manual dexterity or who merely want things to be as easy and simple as possible (e.g., the user is not required to remove the OTE sound processing unit from the head and then remember to turn it over to place into the charging case).

For efficient inductive coupling, the inductive case coil 260 in the lid 252 and the charging coil 121 should be in relatively close proximity to one another. To facilitate optimal positioning of the charging coil 121 relative to the inductive case coil 260, the base 254 also includes a positioning arrangement 272.

Figure 2G:
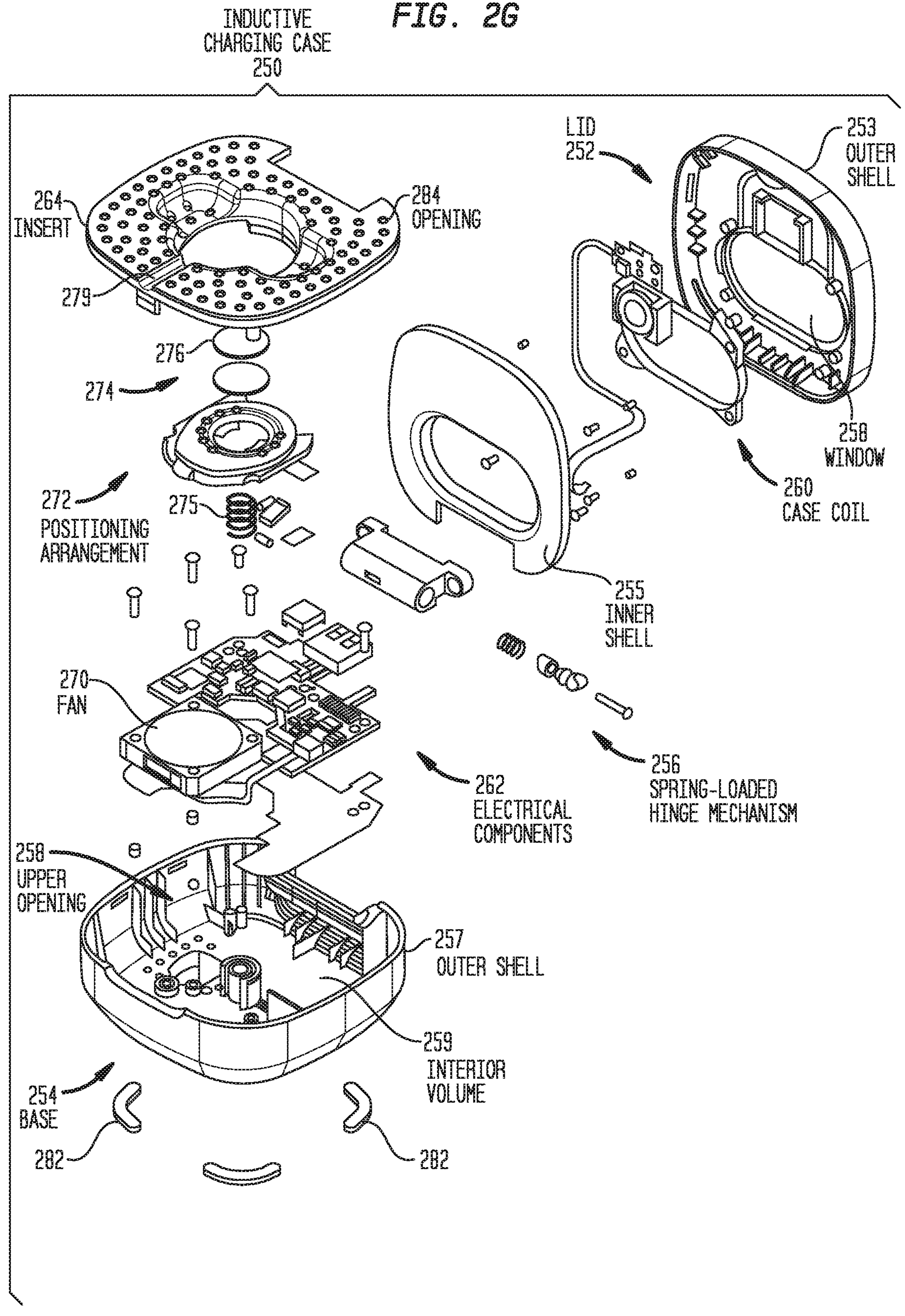
FIG. 2G is an exploded view of the inductive charging case of FIG. 2A.
Figure 2H:
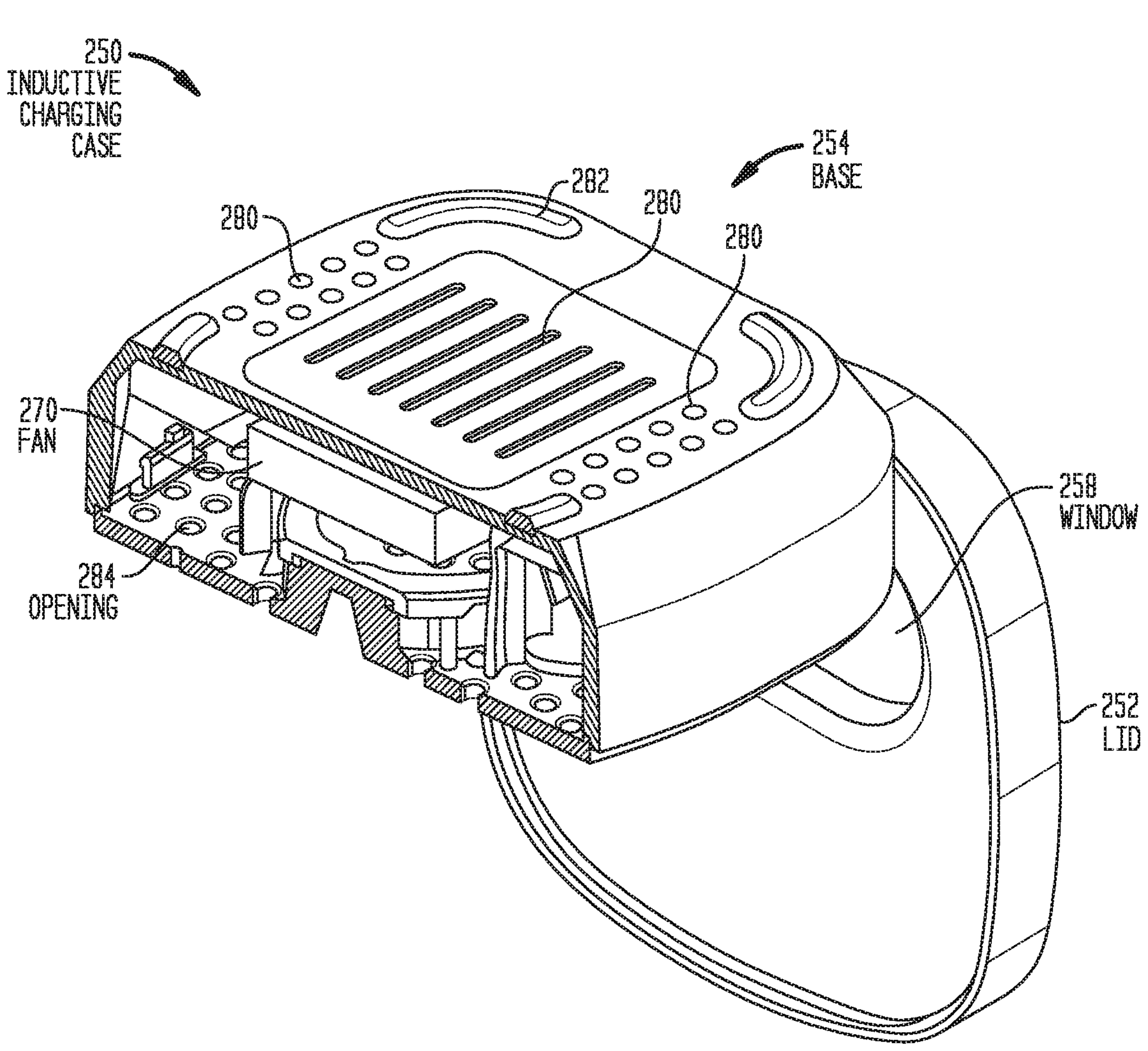
FIG. 2H is a partial cross-sectional view of the inductive charging case of FIG. 2A, where the inductive charging case is shown in the open arrangement.
Figure 2I:
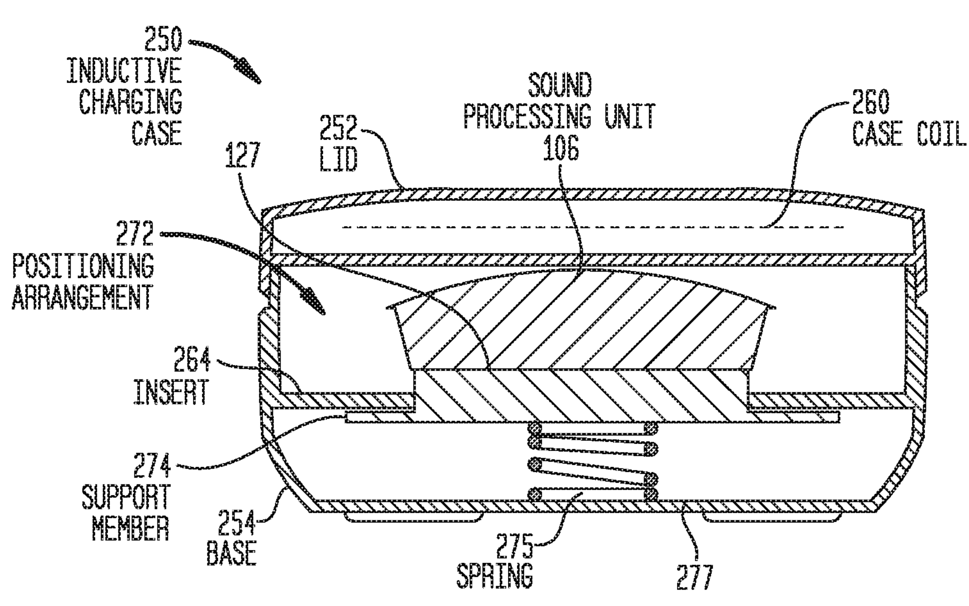
Figure 2J:
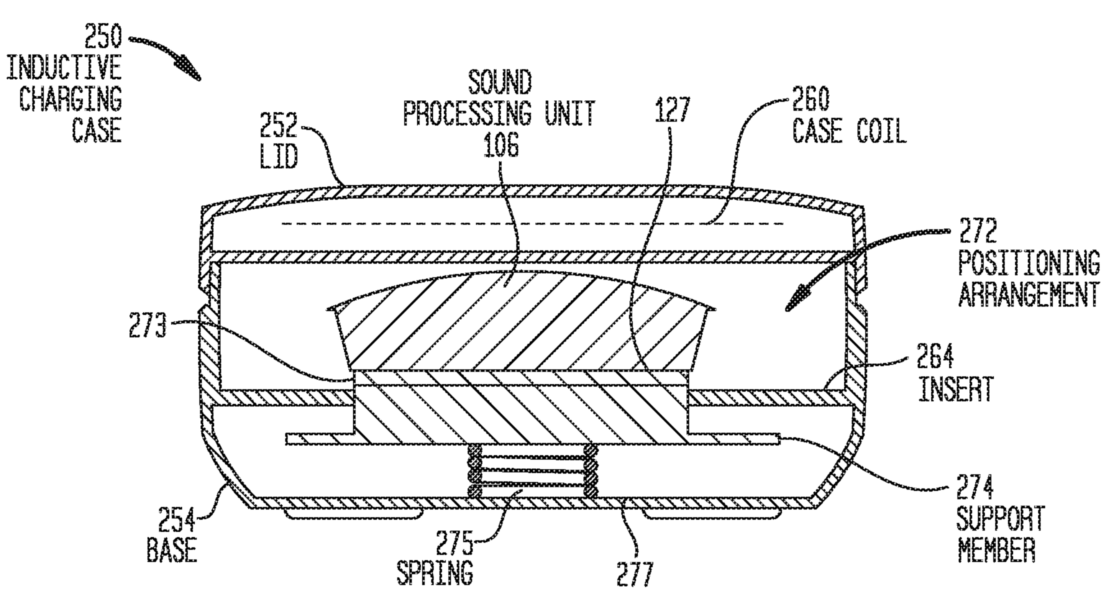

More specifically, as shown in detail in FIGS. 21 and 2J, the moveable positioning arrangement 272 comprises a moveable support member 274 and one or more spring 275. In operation, the support member 274 forms the base/bottom of the central region 267 of device recess 266, while the spring 275 supports the support member 274 (e.g., extends from the support member to a surface, such as a bottom surface 277, of the base 254). As such, when the sound processing unit 106 is positioned in the central region 267, the sound processing unit 106 is supported by (rests on) the support member 274. In addition, the support member 274 which is, in turn, supported by a spring 275, can move relative to the insert 264. In particular, the moveable support member 274 (and in turn the OTE sound processing unit 306 resting on the moveable support member 274) can move relative to the insert along an axis that is generally orthogonal to a primary inner surface 217 the lid 252 (e.g., the support member 274 can move towards and/or away from the lid 252 while the insert 264 remains stationary). This movement of the support member 274 relative to the insert 264 enables the inductive charging case 250 to, for example, accommodate sound processing units with or without a spacer fitted thereon, where in each arrangement the sound processing unit is positioned close to the lid, which allows for optimal inductive coupling between coils 260 and 121).

FIG. 2I illustrates the moveable positioning arrangement 272 and the OTE sound processing unit 106 without a spacer on the OTE sound processing unit 106. FIG. 2J illustrates the moveable positioning arrangement 272 and the OTE sound processing unit 106 with a spacer 273 attached to the skin-facing surface 127 of the OTE sound processing unit 106

In certain embodiments, the positioning arrangement 272 includes a ferromagnetic metal that magnetically attracts to a magnet (not shown) in the OTE sound processing unit 106 to override the magnetic attraction of the magnet in the sound processing unit 106 to the ferrite material of the coil 260 in the lid 252. That is, the ferromagnetic metal in the positioning arrangement 272 has a magnetic strength that is sufficiently strong so as to ensure that the OTE sound processing unit 106 does not attract to the lid 252 (e.g., when the lid is opened), but not so strong that the sound processing unit 106 cannot be removed by weaker users. As shown in FIG. 2G, the positioning arrangement 272 includes a ferromagnetic component 276 that is separate from other elements of the positioning arrangement 272. The ferromagnetic component 276 could be attached (e.g., adhered) to a top or bottom surface of the support member 274. In alternative embodiments, the ferromagnetic metal may be in the support member 274 (e.g., the support member 274 includes or is formed from a ferromagnetic metal).

As noted above, the lid 252 is mechanically coupled to the base 254 via the spring-loaded hinge mechanism 256. The spring-loaded hinge mechanism 256 is configured such that the lid 252 is "sprung" or "automatically" closed, which removes the need for the user to fully close the lid. That is, the lid 252 is self-closing (e.g., not closed only by gravity), and the spring-loaded hinge mechanism 256 provides sufficient force to depress the movable positioning arrangement 272, regardless of whether a spacer is fitted to the sound processing unit. However, the spring-loaded hinge mechanism 256 includes a damper, making the lid 252 "soft-closing" (e.g., does not slam shut). The spring-loaded hinge mechanism 256 has a level of closed or retention strength (e.g., open resisting strength) such that there is some force/resistance to overcome before the lid 252 can be opened, but this retention strength is lower enough such that the lid 252 can be opened by weaker users. The spring-loaded hinge mechanism 256 also has a detent at approximately ninety (90) degrees (e.g., fully open) such that the lid 252 will remain open absent application of a user-applied force (i.e., to resist the return spring).

In certain embodiments, the OTE sound processing unit 106 may have a safety/securing line or clip (not shown) that can be attached to the hair of the recipient. In the examples of FIGS. 2A-2H, the insert 264 includes a groove 279 to accommodate such a safety line when the OTE sound processing unit 106 is placed into the inductive charging case 250 without affecting closing of the lid 252. As such, the user does not have to detach the safety line every time the OTE sound processing unit 106 is docked with the inductive charging case 250.

As noted above, the inductive charging case 250 is configured to inductively charge the at least one rechargeable battery 123 of the OTE sound processing unit 106. That is, as noted above, the inductive charging case 250 includes lid 252 into which a battery charger transmission coil (case coil) 260 is positioned. When the lid 252 is closed with the OTE sound processing unit 106 inside, the case coil 260 communicates with the charger coil 123 located adjacent to the outer-facing surface 129 of OTE sound processing unit 106 and the battery can begin charging. In certain embodiments presented herein, the inductive charging functionality/operations can be combined with drying functionality/operations. For example, in certain embodiments presented herein, heat generated from the inductive charging process can be at least partially utilized to dry the sound processing unit 106.

More specifically, the inductive charging process of the inductive charging case 250 generates residual heat that, in turn, removes/evaporates moisture from the OTE sound processing unit 106 (e.g., from circuitry and other components in the OTE sound processing unit 106). However, the removal of the moisture from the OTE sound processing unit 106 causes the air within the interior 211 of the inductive charging case 250 to become moist (e.g., creates moist air within the interior of the inductive charging case). That is, the air within the enclosed interior 211 of the inductive charging case 250 may be moister than the air outside of the case as a result of, for example, a wet or moist sound processing unit, etc. In addition, the heat from the inductive charging process makes the air within the interior 211 of the case warm/hot, particularly relative to the temperature of the air outside of the case 250.

The presence of hot and/or moist air within the enclosed interior 211 of the case 250 could, over a period of time, damage or harm the rechargeable battery/batteries in the electronic device. As such, the inductive charging case 250 includes a fan 270 in the interior base volume 259 of base 254. The fan 270 is configured to expel the warm and moist air generated by the inductive charging process from the enclosed interior 211 of the case (i.e., force the hot and moist air out of the case 250. Simultaneously, the fan 270 is configured to pull/draw cooler and dryer air from outside of the inductive charging case 250 into the enclosed interior 211 of the case. Circulating dry air into the inductive charging case 250, while expelling the hot and moist air out of the interior 211 of the case 250 further enhances drying of the OTE sound processing unit 106, while improving battery life due to remediation of the harmful effects of heat on the battery/batteries 123.

In the example embodiment of FIGS. 2A-2D, the fan 270 is configured to draw air into the inductive charging case 250 via inlet holes/openings 280 in the outer shell 257 of base 254. The fan 270 circulates this outside air within the interior 211 of the inductive charging case 250 and then expels air out through the seam 283 between the lid 252 and the base 254. That is, the fan 270 draws relatively cooler and dryer air into the interior of the inductive charging case 250, where that air is circulated and mixes with the relatively warmer and/or moister air within the case. As noted, the warmer and/or moister air is then forced out of the inductive charging case 250 through the seam 282 between the lid 252 and the base 254. Again, as noted above, expelling the warmer and/or moister air may improve battery life of the at least one rechargeable battery 123 due to the harmful effects of heat on the battery, while circulating dry air in and wet air out of the interior of the charging case enhances drying of the sound processing unit 106. In general, the purpose of the drying is to extend service life/reliability by minimizing moisture damage such as corrosion.

In the examples of FIGS. 2A-2J, the inlet openings 280 are located in a bottom surface 281 of the outer shell 257 of base 254, although other positions for the inlet openings 280 are possible. The bottom surface 281 also includes feet/spacers 282 (e.g., non-slip pads) that separate the inlet openings 280 from a support surface (e.g., a surface of a table, countertop, nightstand, dresser, etc.) on which the inductive charging case 250 is positioned, thereby ensuring that the inlet openings 280 are not obstructed by the support surface (e.g., airflow remains open).

Once the fan 270 pulls the outside air into the inductive charging case 250 throughs the inlet openings 280, the air can circulate throughout the case. In particular, the insert 264 also includes a plurality of openings 284 that enable air to pass through the insert and circulate about/around the sound processing unit 106. The air is eventually expelled through the lid seam/split.

The inductive charging case 250 includes one or more power input ports configured for connection to a power source/supply, such as an alternating current (AC) source or a direct current (DC) source. In the example of FIGS. 2A-2J, the inductive charging case 250 includes a Universal Serial Bus (USB) input, namely a USB-C power input 285. It is to be appreciated that the USB-C power input 285 is merely illustrative and other types of power inputs may be present in other embodiments. The inductive charging case 250 can also include one or more power output ports. In the example of FIGS. 2A-2J, the inductive charging case 250 includes an USB output, namely a USB-A power output 286. It is to be appreciated that the USB-A power output 286 is merely illustrative and other types of power outputs may be present in other embodiments.

In addition, FIGS. 2A-2J have generally been described with reference to an inductive charging case configured to charge one sound processing unit, namely OTE sound processing unit 106. However, it is to be appreciated that, in alternative embodiments, inductive charging cases presented herein can be configured with a "dual" charging arrangement in which the inductive charging case is configured to receive and charge (e.g., provide power to) two sound processing units (e.g., a dual sound processor configuration charger for bilateral recipients having both a left and right cochlear implant, bimodal recipients, etc.). In such arrangements, various aspects of the inductive charging case 250 could be modified to receive two sound processing units. For example, the size of the case 250 could be enlarged relative to the arrangement of FIGS. 2A-2J, the lid 252 could include two case coils 260, the device recess 266 could be modified to have two central regions 267, additional finger scoops 268 could be added, etc. The benefit of a dual charging arrangement is that bilateral or bimodal recipient would only need one charger.

The dual charging arrangements presented herein could be configured to receive and simultaneously charge different types of sound processing units. For example, inductive charging cases in accordance with embodiments presented herein can be used to charge two OTE sound processing units, two BTE sound processing units, a BTE sound processing unit and an OTE sound processing unit, a BTE sound processing unit and an ITE sound processing unit, and/or other combinations thereof.

Figure 3:
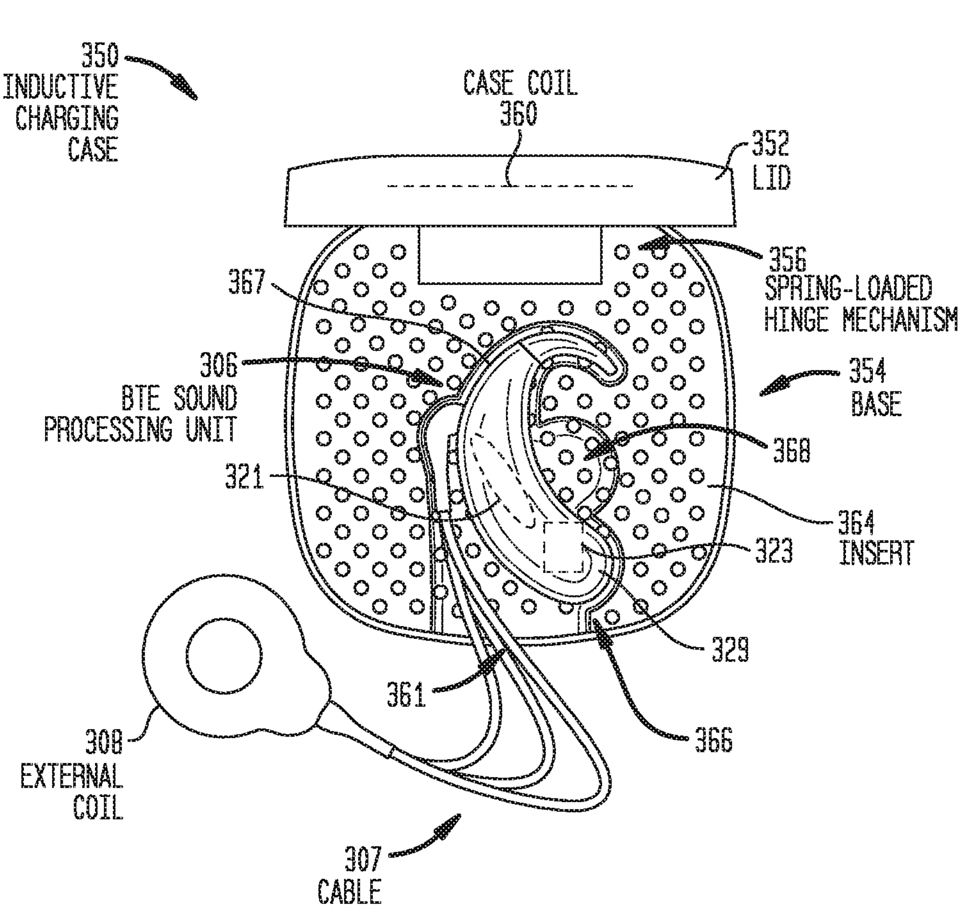
FIG. 3 is a top view of an inductive charging case, in accordance with certain embodiments presented herein, shown in an open arrangement.

FIGS. 2A-2J have generally been described with reference to use with an OTE sound processing unit. However, as noted elsewhere herein, inductive charging cases presented herein may be used to inductively charge a number of different types of devices. For example, FIG. 3 is a top view of an inductive charging case 350 in accordance with embodiments presented herein configured for inductively charging a Behind-The-Ear (BTE) sound processing unit 306. In this example, the BTE sound processing unit 306 has a housing 305 shaped to be worn on the outer ear of the recipient.

The housing 305 of BTE sound processing unit 306 includes, among other components, at least one rechargeable battery 323, communication and charging circuitry (not shown in FIG. 3), and an integrated charging coil 321 positioned adjacent a top-side (outer-facing surface) 329 of the housing 305. To facilitate a complete description, the charging coil 321 is represented in FIG. 3 by a dashed oval, while the at least one rechargeable battery 323 is represented in FIG. 3 by a dashed box. However, it is to be appreciated that, in practice, the charging coil 321 and the at least one rechargeable battery 323 are both disposed inside the housing 305 and would generally not be visible from the outside of the housing 305. It is also to be appreciated that the BTE sound processing unit 306 can include other components that, for ease of illustration, have been omitted from FIG. 3.

Returning to the example of FIG. 3, the BTE sound processing unit 306 is connected to a separate external coil 308 via a cable assembly (cable) 307. The external coil 308 is configured to be inductively coupled to an implantable coil (e.g., implantable coil 114). The BTE sound processing unit 306 also includes a bottom-side (skin-facing surface) 327 (shown in FIG. 4C) that forms an opposing side of the housing 305 from the outer-facing surface 329.

The inductive charging case 350 is substantially similar to the inductive charging case 250 of FIGS. 2A-2J and includes a lid 352 attached to a base 354 via a spring-loaded hinge mechanism 356. The lid 352 of the inductive charging case 350 has an inductive case coil 360 disposed therein.

To facilitate a complete description, charging coil 360 is represented in FIG. 3 by a dashed line. However, it is to be appreciated that, in practice, the inductive case coil (case coil) 360 is disposed inside the lid 352 and would generally not be visible from the outside of the inductive charging case 350.

Again, similar to the embodiments of FIGS. 2A-2J, the lid 352 and base 354, when closed, collectively define an interior volume in which a number of components. These components may include, for example, a fan, inductive charging circuitry including one or more components configured to drive the inductive case coil in a manner that causes the inductive case coil in the lid 352 to emit an electromagnetic field, etc. The inductive charging case 350 also includes an insert 364 that is configured to be positioned at an upper opening of the base 254. The insert 364 is configured to close the interior volume of the base 354, and includes a profiled device recess 366. The device recess 366 includes a central region 367 having an arrangement (e.g., size, shape, etc.) to receive and retain (hold) the BTE sound processing unit 306. As noted, the BTE sound processing unit 306 is shaped to fit behind the ear of a recipient. As such, in this example, the central region 367 of device recess 366 has a corresponding concave shape in which the sound processing unit 306 may be positioned.

In addition to the central region 367, the device recess 366 also comprises one or more finger scoops (cutouts) 368 adjacent to, and extending from, the device recess 366. The one or more finger scoops 368 enable a user's fingers to easily grab the sound processing unit 306 and remove it from the central region 367.

As noted above, the BTE sound processing unit 306 has a skin-facing surface 327 and an outer-facing surface 329. During normal use by a recipient, the skin-facing surface 327 of the sound processing unit 306 faces the head of the recipient, while the outer-facing surface 329 is exposed outwardly. The device recess 366 is configured to receive the sound processing unit 306 with the skin-facing surface 327 resting downwardly (i.e., abutting the insert 364 and facing a bottom of the case), and the outer-facing surface 329 facing upwardly (i.e., facing the lid 352). Therefore, when the lid 352 is closed, the outer-facing surface 329 of the sound processing unit 306 is proximate to the lid 352. FIG. 3 illustrates the sound processing unit 306 positioned in the device recess 366, with the outer-facing surface 329 facing upwardly.

Also as noted above, the charging coil 321 within the sound processing unit 306 is located proximate to the outer-facing surface 329. Therefore, when the lid 352 is closed, the charging coil 321 is proximate to the lid 352 and, accordingly, proximate to the case coil 360 within the lid 352. This positioning (i.e., with the skin-facing surface resting downwardly), enables the charging coil 321 to be inductively coupled with the case coil 360 when the inductive charging case 350 is in the closed arrangement.

Stated differently, the provision of the charging coil in the lid 352 of the inductive charging case 350, with the top-side charging coil 321 in the BTE sound processing unit 306, allows the sound processing unit 306 to maintain a uniform orientation when moved from the head of the recipient to the interior of the inductive charging case 350 for recharging (i.e., with the processor resting in the charger on its skin-facing surface 327, which normally faces the head of a recipient during use by the recipient), and vice versa. Such a uniform orientation provides a usability benefit for those who lack manual dexterity or who merely want things to be as easy and simple as possible (e.g., the user is not required to remove the BTE from the head and then remember to turn it over to place into the charging case 350).

For efficient inductive coupling, the charging coil in the lid 352 and the charging coil 321 should be in relatively close proximity to one another. To facilitate optimal positioning of the charging coil 321 relative to the inductive case coil 360, the base 354 also includes a positioning arrangement that may be similar to positioning arrangement 272 of FIGS. 2A-2J. For brevity and ease of illustration, the positioning arrangement of inductive charging case 350 is not shown in FIG. 3.

As noted above, the lid 352 is mechanically coupled to the base 354 via spring-loaded hinge mechanism 356. The spring-loaded hinge mechanism 356 is similar to spring-loaded hinge mechanism 256, described above. That is, the spring-loaded hinge mechanism 356 is configured such that the lid 352 is sprung closed, which removes the need for the user to fully close it (e.g., the lid 352 is self-closing). The spring-loaded hinge mechanism 356 provides sufficient force to depress the movable positioning arrangement, but also includes a damper, making the lid 352 "soft-closing" (e.g., does not slam shut). The spring-loaded hinge mechanism 356 has a level of closed or retention strength such that there is some force/resistance to overcome before the lid can be opened, but this retention strength is lower enough such that the lid 352 can be opened by weaker users. The spring-loaded hinge mechanism 356 also has a detent at approximately ninety (90) degrees (e.g., fully open) such that the lid 352 will remain open absent application of a user-applied force (i.e., to resist return spring).

As noted, the BTE sound processing unit 306 is connected to the external coil 308 via a cable assembly 307. In the example of FIG. 3, the inductive charging case 350 includes an opening 361 to accommodate the cable assembly 307 line when the sound processing unit 306 is placed into the inductive charging case 350 without affecting closing of the lid 352. As such, the user does not have to detach the cable assembly 307 and external coil 308 every time the sound processing unit 306 is docked with the inductive charging case 350.

The inductive charging case 350 is configured to inductively charge the at least one rechargeable battery 323 of the BTE sound processing unit 306. In certain embodiments presented herein, the inductive charging functionality of inductive charging case 350 can be combined with drying functionality, as described above with reference to FIGS. 2A-2J. That is, the inductive charging case 350 includes a fan configured to force hot and moist air out of the case 350, while pulling/drawing outside air into the interior of the inductive charging case 350 via inlet holes/openings. The fan circulates the outside air within the interior of the inductive charging case 350 and then expels air out through the seam between the lid 352 and the base 354. Expelling the warmer and/or moister air may improve battery life of the at least one rechargeable battery 323 due to the harmful effects of heat on the battery, while circulating dry air in and wet air out of the interior of the charging case enhances drying of the sound processing unit 306. The air is pulled in through openings in the base (underneath) the bottom-side of the charger, this then flows through the holes in the insert and is then expelled through the lid seam/split. For brevity and ease of illustration, the fan of inductive charging case 350 is not shown in FIG. 3.

FIG. 3 has been described with reference to a charging coil 321 integrated in the sound processing unit 306. In certain embodiments, the charging coil may be omitted from the sound processing unit 306 and the external coil 308 operates as a so-called "dual-use" coil that is configured to both receiving power for recharging the at least one rechargeable battery, and to transmit recharging power to an implantable component. In such an alternative embodiment, the device recess 366 may be configured to receive and retain the external coil 308, rather than the sound processing unit 306. With such a modification, the inductive case coil 360 in the lid 352 and the external coil 308 could be inductively coupled when the external coil 308 is positioned in the inductive charging case 350. In such an embodiment, the sound processing unit 306 could remain outside of the inductive charging case 350 (e.g., switch the locations of the external coil 308 and the sound processing unit 306 from what is shown in FIG. 3).

In addition, FIG. 3 has generally been described with reference to an inductive charging case configured to charge one sound processing unit, namely BTE sound processing unit 306. However, it is to be appreciated that, in alternative embodiments, inductive charging cases presented herein can be configured with a "dual" charging arrangement in which the inductive charging case is configured to receive and charge (e.g., provide power to) two sound processing units (e.g., a dual sound processor configuration charger for bilateral recipients having both a left and right cochlear implant, bimodal recipients, etc.). In such arrangements, various aspects of the inductive charging case 350 could be modified to receive two sound processing units. For example, the size of the case 350 could be enlarged relative to the arrangement of FIG. 3, the lid 352 could include two case coils 360, the device recess 366 could be modified to have two central regions 367, additional finger scoops 368 could be added, etc. The benefit of a dual charging arrangement is that bilateral or bimodal recipient would only need one charger.

The dual charging arrangements presented herein could be configured to receive and simultaneously charge different types of sound processing units. For example, inductive charging cases in accordance with embodiments presented herein can be used to charge two OTE sound processing units, two BTE sound processing units, a BTE sound processing unit and an OTE sound processing unit, a BTE sound processing unit and an ITE sound processing unit, and/or other combinations thereof.

Figures 4A, 4B, 4C:
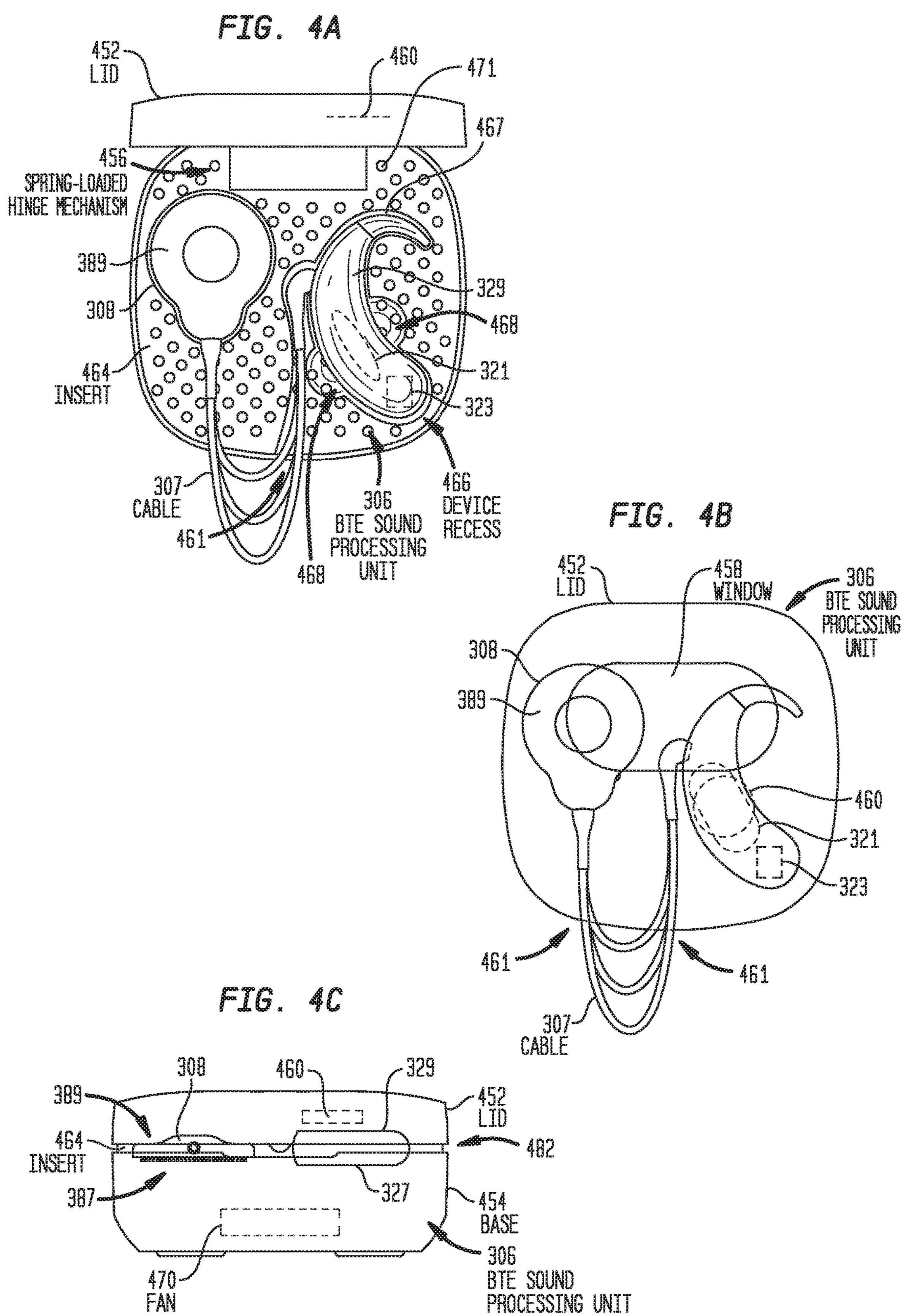
FIG. 4A is top view of an inductive charging case, in accordance with certain embodiments presented herein, where the inductive charging case is shown in an open arrangement.
FIG. 4B is a top view of the inductive charging case of FIG. 4A, where the inductive charging case is shown in a closed arrangement.
FIG. 4C is a front view of the inductive charging case of FIG. 4A, where the inductive charging case is shown in a closed arrangement.

FIGS. 4A-4C illustrate another example inductive charging case 450, in accordance with embodiments presented herein, which is configured for use in inductively charging the BTE sound processing unit 306, described above with reference to FIG. 3. FIG. 4A is a top view of the inductive charging case 450 in an open arrangement, FIG. 4B is a top of the inductive charging case 450 in a closed arrangement, and FIG. 4C is a side view of the inductive charging case 450 in the closed arrangement. For ease of description, FIGS. 4A-4C will generally be described together.

In FIGS. 4B and 4C, portions of the inductive charging case 450 are shown as being transparent/opaque so as to make the sound processing unit 306, as well as several internal components of the charging case, visible in the drawings. It is to be appreciated that this is merely for ease of illustration and that, in practice, the sound processing unit 306 and the other components of the inductive charging case 450, as noted below, would not generally be visible through the inductive charging case 450, except through the transparent window 458 which may be similar to the transparent window 258 of FIGS. 2A-2J.

As noted, the BTE sound processing unit 306 has a housing 305 that includes, among other components, the at least one rechargeable battery 323 and the integrated charging coil 321 positioned adjacent the outer-facing surface 329 of the housing 305. To facilitate a complete description, the charging coil 321 is shown in FIGS. 4A and 4B by a dashed oval, while the at least one rechargeable battery 323 is represented in FIGS. 4A and 4B by a dashed box. Also as noted, the BTE sound processing unit 306 is connected to a separate external coil 308 via a cable assembly 307. The BTE sound processing unit 306 also includes a bottom (skin-facing) surface 327 that forms an opposing side of the housing 305 from the outer-facing surface 329.

The inductive charging case 450 is substantially similar to the inductive charging case 250 of FIGS. 2A-2J and includes a lid 452 attached to a base 454 via a spring-loaded hinge mechanism 456. The lid 452 of the inductive charging case 450 has an inductive case coil 460 disposed therein. Again, to facilitate a complete description, portions of the inductive charging case 450 are shown as being transparent/opaque so as to make the inductive case coil 460 visible in FIGS. 4B and 4C. It is to be appreciated that, in practice, the inductive case coil 460 would not generally be visible within the lid 452 of the inductive charging case 450

Again, similar to the above embodiments, the lid 452 and base 454 collectively define an interior volume in which a number of components. These components may include, for example, a fan 470, inductive charging circuitry including one or more components configured to drive the inductive case coil in a manner that causes the inductive case coil 460 in the lid 452 to emit an electromagnetic field, etc.

The inductive charging case 450 also includes an insert 464 that is configured to be positioned at an upper opening of the base 454. The insert 464 is configured to close the interior volume of the base 454, and includes a profiled device recess 466. The device recess 466 includes a central region 467 having an arrangement (e.g., size, shape, etc.) to receive and retain (hold) the sound processing unit 306. As noted, the sound processing unit 306 is a BTE unit shaped to fit behind the ear of a recipient. As such, in this example, the central region 467 of device recess 466 has a corresponding concave shape in which the sound processing unit 306 may be positioned.

In addition to the central region 467, the device recess 466 also comprises one or more finger scoops (cutouts) 468 extending from, and adjacent to, the central region 467. The one or more finger scoops 468 enable a user's fingers to easily grab the sound processing unit 306 and remove it from the central region 467.

As noted above, the BTE sound processing unit 306 has a skin-facing surface 327 and an outer-facing surface 329. During normal use by a recipient, the skin-facing surface 327 of the sound processing unit 306 faces the head of the recipient, while the outer-facing surface 329 is exposed outwardly. The device recess 366 is configured to receive the sound processing unit 306 with the skin-facing surface 327 resting downwardly (i.e., abutting the insert 464), and the outer-facing surface 329 facing upwardly (i.e., facing the lid 452). Therefore, when the lid 452 is closed, the outer-facing surface 329 of the sound processing unit 306 is proximate to the lid 452.

Moreover, in the example of FIGS. 4A-4C, the insert 464 further includes a coil recess 488 that is configured to receive and retain the external coil 308 therein. The external coil 308 includes a bottom (skin-facing) surface 387 and a top (outer-facing) surface 389. In the example of FIGS. 4A-4C, the coil recess 488 is configured to receive the external coil 308 with the skin-facing surface 387 resting downwardly (i.e., abutting the insert 464), and the outer-facing surface 389 facing upwardly (i.e., facing the lid 452). Therefore, when the lid 452 is closed, the outer-facing surface 389 of the external coil 308 is proximate to the lid 452.

Also as noted above, the charging coil 321 within the sound processing unit 306 is located proximate to the outer-facing surface 329. Therefore, when the lid 452 is closed, the charging coil 321 is proximate to the lid 352 and, accordingly, proximate to the inductive case coil 460 within the lid 452. This positioning (i.e., with the skin-facing surface 327 resting downwardly), enables the charging coil 321 to be inductively coupled with the inductive case coil 460 when the inductive charging case 450 is in the closed arrangement.

Stated differently, the provision of the charging coil in the lid 452 of the inductive charging case 450, with the top-side charging coil 321 in the BTE sound processing unit 306, allows the sound processing unit 306, and the external coil 308, to maintain a uniform orientation when moved from the head of the recipient to the interior of the inductive charging case 450 for recharging (i.e., with the processor and the external coil resting in the charger on their bottom (skin-facing) sides, which normally faces the head of a recipient during use by the recipient), and vice versa. Such a uniform orientation provides a usability benefit for those who lack manual dexterity or who merely want things to be as easy and simple as possible (e.g., the user is not required to remove the BTE and coil from the head and then remember to turn it over to place into the charging case 450).

For efficient inductive coupling, the inductive case coil 460 in the lid 452 and the charging coil 321 should be in relatively close proximity to one another. To facilitate optimal positioning of the charging coil 321 relative to the inductive case coil 460, the base 454 also includes a positioning arrangement that may be similar to positioning arrangement 272 of FIGS. 2A-2J. For brevity and ease of illustration, the positioning arrangement of inductive charging case 450 is not shown in FIGS. 4A-4C.

As noted above, the lid 452 is mechanically coupled to the base 454 via spring-loaded hinge mechanism 456. The spring-loaded hinge mechanism 456 is configured such that the lid 452 is sprung closed, which removes the need for the user to fully close it (e.g., the lid 452 is self-closing). The spring-loaded hinge mechanism 456 provides sufficient force to depress the positioning arrangement, but also includes a damper, making the lid 452 "soft-closing" (e.g., does not slam shut). The spring-loaded hinge mechanism 456 has a level of closed or retention strength such that there is some force/resistance to overcome before the lid can be opened, but this retention strength is lower enough such that the lid 452 can be opened by weaker users. The spring-loaded hinge mechanism 456 also has a detent at approximately ninety (90) degrees (e.g., fully open) such that the lid 452 will remain open absent application of a user-applied force (i.e., to resist return spring).

As noted, the BTE sound processing unit 306 is connected to the external coil 308 via a cable assembly 307. In the example of FIGS. 4A-4C, the inductive charging case 350 includes openings 461 to accommodate the cable assembly 307 when the sound processing unit 306 and external coil 308 are placed into the inductive charging case 450 without affecting closing of the lid 452.

The inductive charging case 450 is configured to inductively charge the at least one rechargeable battery 323 of the BTE sound processing unit 306. In certain embodiments presented herein, the inductive charging functionality of inductive charging case 450 can be combined with drying functionality, as described above with reference to FIGS. 2A-2J. That is, the inductive charging case 450 includes a fan 470 configured to force hot and moist air out of the case 450, while pulling/drawing outside air into the interior of the inductive charging case 350 via inlet holes/openings. The fan 470 pulls the air in through openings in the base 454, such as openings underneath the bottom-side of the charging case, and this air then flows through holes 484 in the insert 464. The fan 470 circulates the outside air within the interior of the inductive charging case 450 and then expels air out through the seam 482 between the lid 452 and the base 454. Expelling the warmer and/or moister air may improve battery life of the at least one rechargeable battery 323 due to the harmful effects of heat on the battery, while circulating dry air in and wet air out of the interior of the charging case enhances drying of the sound processing unit 306.

FIGS. 4A-4C have been described with reference to a charging coil 321 integrated in the sound processing unit 306. However, as noted, the inductive charging case 450 is configured such that the external coil 308 is positioned within the charging case, proximate to the lid 452. In certain embodiments, the charging coil may be omitted from the sound processing unit 306 and the external coil 308 operates as a so-called "dual-use" coil that is configured to both receiving power for recharging the at least one rechargeable battery, and to transmit recharging power to an implantable component. In such embodiments, the inductive case coil 460 in the lid 460 could be positioned such that it is proximate to the outer-facing surface 389 of external coil 308, rather than the outer-facing surface 329 of the sound processing unit 306. With such a modification, the inductive case coil 460 in the lid 460 and the external coil 308 could be inductively coupled when the external coil 308 is positioned in the inductive charging case 450.

Figures 5A, 5B, 5C:
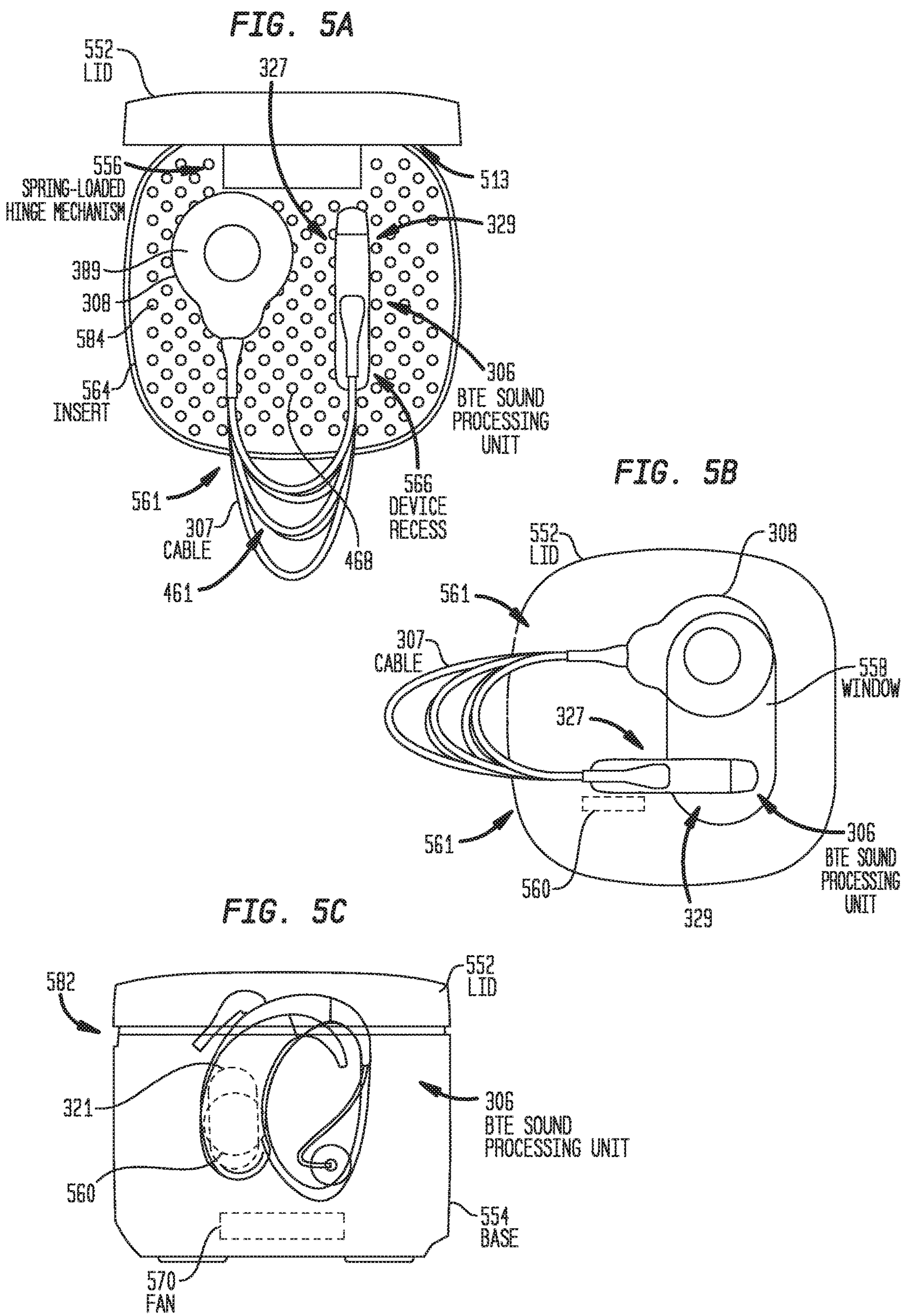
FIG. 5A is top view of an inductive charging case, in accordance with certain embodiments presented herein, where the inductive charging case is shown in an open arrangement.
FIG. 5B is a top view of the inductive charging case of FIG. 5A, where the inductive charging case is shown in a closed arrangement.
FIG. 5C is a front view of the inductive charging case of FIG. 5A, where the inductive charging case is shown in a closed arrangement.

FIGS. 5A-5C illustrate another example inductive charging case 550, in accordance with embodiments presented herein, which is configured for use in inductively charging the BTE sound processing unit 306, described above with reference to FIG. 3. FIG. 5A is a top view of the inductive charging case 550 in an open arrangement, FIG. 5B is a top of the inductive charging case 550 in a closed arrangement, and FIG. 5C is a side view of the inductive charging case 550 in the closed arrangement. For ease of description, FIGS. 5A-5C will generally be described together.

In FIGS. 5B and 5C, portions of the inductive charging case 550 are shown as being transparent/opaque so as to make the sound processing unit 306, as well as several internal components of the charging case, visible in the drawings. It is to be appreciated that this is merely for ease of illustration and that, in practice, the sound processing unit 306 and the other components of the inductive charging case 550, as noted below, would not generally be visible through the inductive charging case 550, except through the transparent window 558 which may be similar to the transparent window 258 of FIGS. 2A-2J.

As noted, the BTE sound processing unit 306 has a housing 305 that includes, among other components, the at least one rechargeable battery 323 and the integrated charging coil 321 positioned adjacent the outer-facing surface 329 of the housing 305. To facilitate a complete description, the charging coil 321 is shown in FIGS. 5C, but has been omitted from FIGS. 5A and 5B for ease of illustration. Also, for ease of illustration, the at least one rechargeable battery 323 has also been omitted from FIGS. 5A-5C. Also as noted, the BTE sound processing unit 306 is connected to a separate external coil 308 via a cable assembly 307.

The inductive charging case 550 includes a lid 552 attached to a base 554 via a spring-loaded hinge mechanism 556. The base 554 of the inductive charging case 550 has an inductive case coil 560 disposed therein. Again, to facilitate a complete description, portions of the inductive charging case 550 are shown as being transparent/opaque so as to make the inductive case coil 560 and fan 570 of the case visible in FIGS. 5B and 5C. It is to be appreciated that, in practice, the inductive case coil 560 and fan 570 would not generally be visible within the inductive charging case 550

Again, similar to the above embodiments, the lid 552 and base 554 collectively define an enclosed interior volume in which a number of components can be positioned. These components may include, for example, the inductive case coil 560, the fan 570, inductive charging circuitry including one or more components configured to drive the inductive case coil 560 in a manner that causes the inductive case coil 560 in the lid 552 to emit an electromagnetic field, etc.

The inductive charging case 550 also includes an insert 564 that is configured to be positioned at an upper opening of the base 554. The insert 564 is configured to close the interior volume of the base 554, and includes a profiled device recess 566. The device recess 566 has an arrangement (e.g., size, shape, etc.) to receive and retain (hold) the BTE sound processing unit 306. As noted, the BTE sound processing unit 306 is shaped to fit behind the ear of a recipient. As such, in this example, the central region 567 of device recess 566 has a corresponding concave shape in which the sound processing unit 306 may be positioned.

As noted above, the BTE sound processing unit 306 has a skin-facing surface 327 and an outer-facing surface 329. In contrast to the above embodiments in which the skin-facing surface 327 rests downwardly, in the embodiments of FIGS. 5A-5C both the skin-facing surface 327 and the outer-facing surface 329 are generally orthogonal to a primary inner surface 513 of the lid 552. That is, the sound processing unit 306, when positioned in the device recess 566, has a general vertical orientation. When the lid 552 is closed, a portion of the sound processing unit 306 extends above the insert 564, which enables a user to grab and remove the sound processing unit from the device recess 566. Additionally, when the sound processing unit 306 is positioned in the device recess 566, the outer-facing surface 329, and thus the charging coil 321, of the sound processing unit 306 is proximate to the inductive case coil 560.

Moreover, in the example of FIGS. 5A-5C, the insert 564 further includes a coil recess 588 that is configured to receive and retain the external coil 308 therein. The external coil 308 includes a skin-facing surface 387 and an outer-facing surface 389. In the example of FIGS. 5A-5C, the coil recess 588 is configured to receive the external coil 308 with the skin-facing surface 387 resting downwardly (i.e., abutting the insert 564), and the outer-facing surface 389 facing upwardly (i.e., facing the lid 552). Therefore, when the lid 552 is closed, the outer-facing surface 389 of the external coil 308 is proximate to the lid 552.

As noted above, the lid 552 is mechanically coupled to the base 554 via spring-loaded hinge mechanism 556. The spring-loaded hinge mechanism 556 is configured such that the lid 552 is sprung closed, which removes the need for the user to fully close it (e.g., the lid 552 is self-closing). The spring-loaded hinge mechanism 556 includes a damper, making the lid 552 "soft-closing" (e.g., does not slam shut). The spring-loaded hinge mechanism 556 has a level of closed or retention strength such that there is some force/resistance to overcome before the lid can be opened, but this retention strength is lower enough such that the lid 552 can be opened by weaker users. The spring-loaded hinge mechanism 556 also has a detent at approximately ninety (90) degrees (e.g., fully open) such that the lid 552 will remain open absent application of a user-applied force (i.e., to resist return spring).

As noted, the BTE sound processing unit 306 is connected to the external coil 308 via a cable assembly 307. In the example of FIGS. 5A-5C, the inductive charging case 550 includes openings 561 to accommodate the cable assembly 307 when the sound processing unit 306 and external coil 308 are placed into the inductive charging case 550 without affecting closing of the lid 552.

The inductive charging case 550 is configured to inductively charge the at least one rechargeable battery 323 of the BTE sound processing unit 306. In certain embodiments presented herein, the inductive charging functionality of inductive charging case 550 can be combined with drying functionality, as described above with reference to FIGS. 2A-2J. That is, the inductive charging case 550 includes a fan 570 configured to force hot and moist air out of the case 550, while pulling/drawing outside air into the interior of the inductive charging case 350 via inlet holes/openings. The fan 570 pulls the air in through openings in the base 554, such as openings underneath the bottom-side of the charging case, and this air then flows through holes 584 in the insert 564. The fan 570 circulates the outside air within the interior of the inductive charging case 550 and then expels air out through the seam 582 between the lid 552 and the base 554. Expelling the warmer and/or moister air may improve battery life of the at least one rechargeable battery 323 due to the harmful effects of heat on the battery, while circulating dry air in and wet air out of the interior of the charging case enhances drying of the sound processing unit 306.

Inductive charging cases in accordance with embodiments presented herein have been primarily described with reference to sound processing units of auditory prostheses, namely sound processing units of auditory prostheses. However, as noted above, it is to be appreciated that the inductive charging cases presented herein may also be used to charge a variety of other types of electronic devices, including external components of other types of implantable medical devices that provide a wide range of therapeutic benefits to recipients, patients, or other users. For example, the inductive charging cases herein may be used with external components of other auditory prostheses, such as acoustic hearing aids, middle ear auditory prostheses, bone conduction devices, direct acoustic stimulators, electro-acoustic prostheses, other electrically simulating auditory prostheses (e.g., auditory brain stimulators), etc. The techniques presented herein may also be used with tinnitus therapy devices, vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc. Moreover, it is to be appreciated that the inductive charging cases present herein could be used to charge any electronic device having an inductive charging coil, including electronic devices that are not part of an implantable medical device (e.g., wireless headphones or wireless ear-buds, wearable devices, such as activity trackers, watches, blood pressure sensors, etc., handheld devices, etc.).

FIG. 6 illustrates an example vestibular stimulator 602 in accordance with embodiments presented herein. In this example, the vestibular stimulator 602 comprises an implantable component 612 and an external device/component 604. More specifically, the implantable component 612 comprises an implant body (main module) 634, a lead region 636, and a stimulating assembly 616, all configured to be implanted under the skin/tissue (tissue) 615 of the recipient. The implant body 634 generally comprises a hermetically-sealed housing 638 in which RF interface circuitry, one or more rechargeable batteries, and a stimulator unit are disposed. The implant body 134 also includes an internal/implantable coil 614 that is generally external to the housing 638, but which is connected to the transceiver via a hermetic feedthrough (not shown).

The stimulating assembly 616 comprises a plurality of electrodes 644 disposed in a carrier member (e.g., a flexible silicone body). In this specific example, the stimulating assembly 616 comprises three (3) stimulation electrodes, referred to as stimulation electrodes 644(1), 644(2), and 644(3). The stimulation electrodes 644(1), 644(2), and 644 (3) function as an electrical interface for delivery of electrical stimulation signals to the recipient's vestibular system. The stimulating assembly 616 is configured such that a surgeon can implant the stimulating assembly adjacent the recipient's otolith organs via, for example, the recipient's oval window. It is to be appreciated that this specific embodiment with three stimulation electrodes is merely illustrative and that the techniques presented herein may be used with stimulating assemblies having different numbers of stimulation electrodes, stimulating assemblies having different lengths, etc.

As noted above, the vestibular nerve stimulator 602 comprises RF interface circuitry and one or more rechargeable batteries. In certain examples, the external device 604 that is configured to charge/recharge the one or more rechargeable batteries through the inductive transfer of power via the RF interface circuitry. That is, the external device 604 comprises an external coil 608 configured to be inductively coupled with the implantable coil 614. When inductively coupled, the external coil 608 and the implantable coil 614 form a closely-coupled wireless link by which power is transferred from one or more rechargeable batteries 623 of the external device 604 through the skin/tissue 615 of the recipient.

The external device 604 also includes a charging coil 621 that enables inductive charging of the one or more rechargeable batteries 623 through the use of an inductive charging case presented herein. That is, the external device 604 may be placed within an inductive charging case presented herein, such as one of inductive charging cases 250, 350, 450, or 550, such that the charging coil 621 is in proximity to, and inductively coupled to, the case coil of the charging case.

Figure 7:
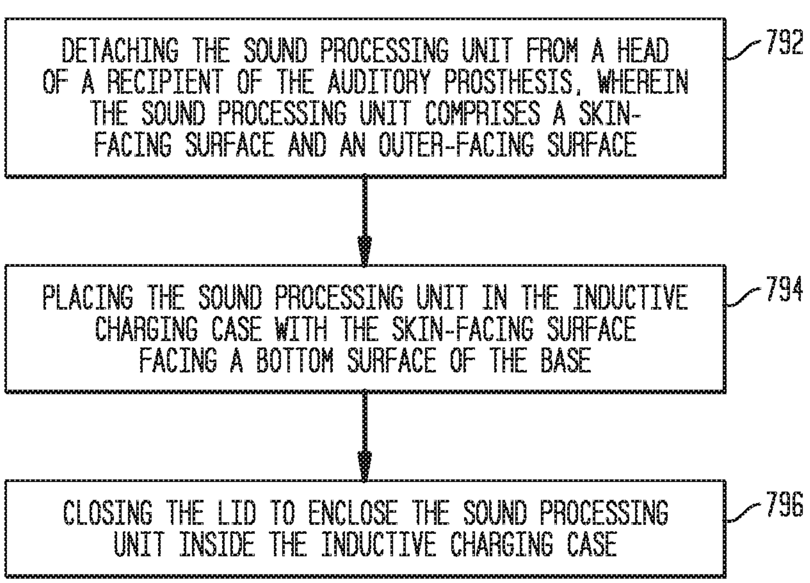
FIG. 7 is a flowchart of a method, in accordance with certain embodiments presented herein.

FIG. 7 is a flowchart of a method 790 for inductively charging a sound processing unit of an auditory prosthesis with an inductive charging case comprising a base and a lid attached to the base via hinge mechanism. Method 790 begins at 792 where a user detaches the sound processing unit from a head of a recipient of the auditory prosthesis, wherein the sound processing unit comprises a skin-facing surface and an outer-facing surface. At 792, the user places the sound processing unit in the inductive charging case with the skin-facing surface facing a bottom surface of the base. At 794, the user closes the lid to enclose the sound processing unit in the inductive charging case.

Figure 8:
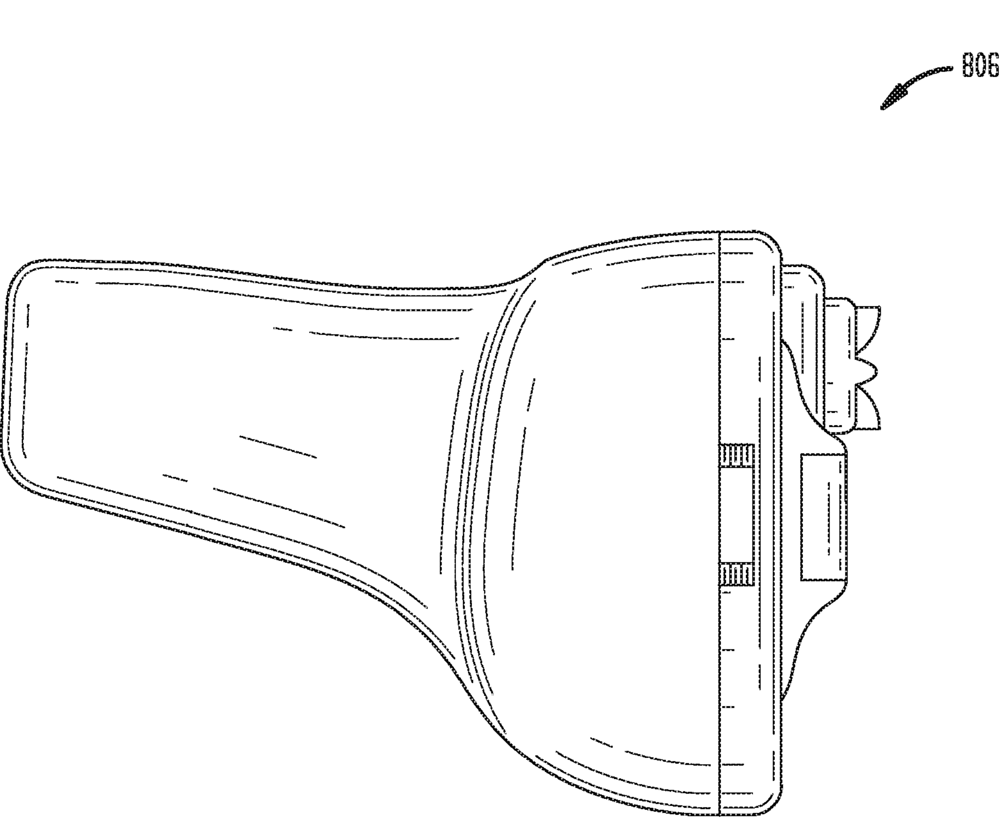
FIG. 8 is a schematic diagram illustrating an in-the-ear (ITE) component/device that can be charged by an inductive charging case in accordance with certain embodiments presented herein.
Figure 9:
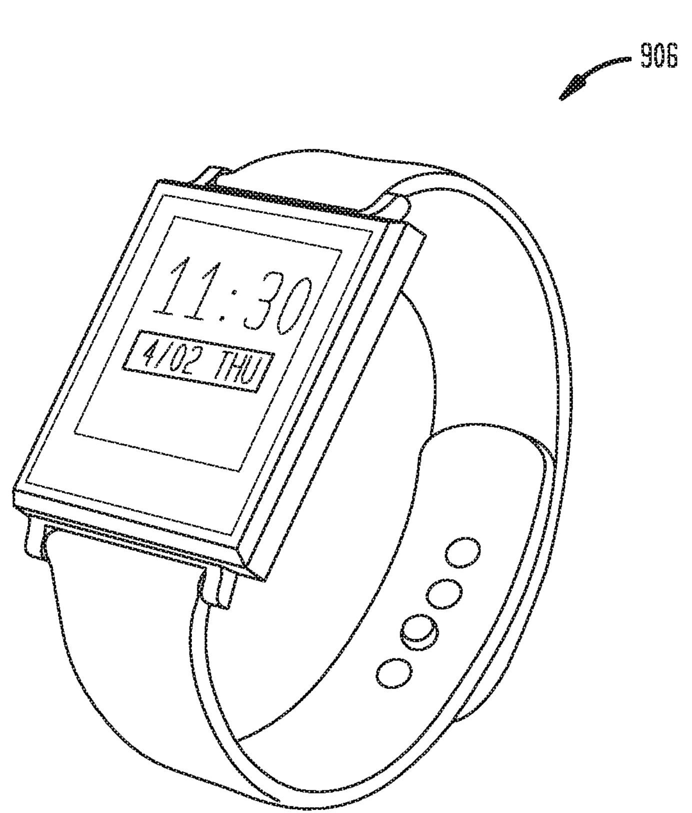
FIG. 9 is a schematic diagram illustrating a wearable device (e.g., smartwatch, fitness tracker, etc.) that can be charged by an inductive charging case in accordance with certain embodiments presented herein.

As noted, inductive charging cases presented herein may be used to charge a variety of electronic devices. For example, FIG. 8 is a schematic diagram illustrating an in-the-ear (ITE) component/device 806 that can be charged by an inductive charging case in accordance with certain embodiments presented herein. The ITE device 806 may be an external component of an implantable medical device, an in-the-ear headphone (e.g., wireless earbud), etc. In addition, FIG. 9 is a schematic diagram illustrating a wearable device 906 (e.g., smartwatch, fitness tracker, etc.) that can be charged by an inductive charging case in accordance with certain embodiments presented herein.

It is to be appreciated that the embodiments presented herein are not mutually exclusive and that the various embodiments may be combined with another in any of a number of different manners.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An inductive charging case, comprising:

a base;

a lid attached to the base via a hinge mechanism, wherein in a closed arrangement, the lid and base collectively define an interior volume configured to enclose an electronic device therein;

an inductive case coil disposed in the lid, wherein the inductive case coil is configured for inductive coupling with a charging coil in the electronic device;

a positioning arrangement in the base configured to receive the electronic device, wherein the positioning arrangement is configured to urge the electronic device toward the lid while the lid is in the closed arrangement; and one or more openings configured to, when the electronic device is positioned in the positioning arrangement, receive an attachment and enable the attachment to pass from the interior volume to an exterior of the inductive charging case while the attachment is connected to the electronic device and while the inductive charging case is in the closed arrangement.

2. The inductive charging case of claim 1, wherein the positioning arrangement further comprises:

an insert positioned in the base, wherein the insert comprises a profiled device recess configured to receive the electronic device therein.

3. The inductive charging case of claim 2, wherein the profiled device recess comprises:

a central region having a shape corresponding to a shape of the electronic device; and one or more finger scoops adjacent to, and extending from, the central region.

4. The inductive charging case of claim 3, wherein the central region has a generally cylindrical shape corresponding to a cylindrical shape of the electronic device.

5. The inductive charging case of claim 2, wherein the positioning arrangement is configured to urge the electronic device toward the lid along an axis that is generally orthogonal to the lid.

6. The inductive charging case of claim 5, wherein the positioning arrangement comprises:

a moveable support member forming a bottom surface of at least a portion of the profiled device recess; and one or more springs attached to the moveable support member and a surface of the base such that the one or more springs urge the moveable support member and the electronic device away from the surface of the base and toward the lid.

7. The inductive charging case of claim 2, wherein the electronic device is an off-the-ear (OTE) component, wherein the attachment is a securing line, and wherein the one or more openings comprise a groove of the insert.

8. The inductive charging case of claim 2, wherein the electronic device is a behind-the-ear (BTE) component having an external coil, and wherein the attachment is a cable assembly.

9. The inductive charging case of claim 1, further comprising:

a ferromagnetic metal component disposed in an interior of the base, wherein the ferromagnetic metal component is configured to magnetically attract to a magnet disposed in the electronic device.

10. The inductive charging case of claim 1, further comprising a transparent window arranged for visibility of one or more status indicators of the electronic device from outside of the inductive charging case when the lid is closed.

11. The inductive charging case of claim 1, further comprising:

a fan configured to draw air from outside of the inductive charging case into the interior volume and to expel air from the interior volume to outside of the inductive charging case.

12. The inductive charging case of claim 1, wherein the hinge mechanism is a spring-loaded hinge mechanism configured to self-close the lid.

13. The inductive charging case of claim 12, wherein the hinge mechanism comprises a damper configured to soft-close the lid.

14. An inductive charging case, comprising:

a base comprising a concave outer shell defining an upper opening;

a lid attached to the base via a hinge mechanism and configured to close the upper opening;

an insert disposed in the upper opening of the base, wherein the insert comprises a device recess configured to receive an electronic device therein; and a positioning arrangement comprising:

a moveable support member forming at least a portion of the device recess; and one or more springs attached to a surface of the base and the moveable support member such that the one or more springs support the moveable support member and are configured to urge the moveable support member and the electronic device to move along an axis that is generally orthogonal to the upper opening.

15. The inductive charging case of claim 14, wherein the one or more springs are configured to urge a portion of the moveable support member toward the insert.

16. The inductive charging case of claim 14, wherein the device recess comprises:

a central region having a shape corresponding to a shape of the electronic device; and one or more finger scoops adjacent to, and extending from, the central region.

17. The inductive charging case of claim 14, wherein the electronic device is an off-the-ear (OTE) component having a securing line attached thereto, and wherein the insert includes a groove configured to receive the securing line while attached to the OTE component and when the OTE component is positioned in the device recess.

18. The inductive charging case of claim 14, wherein the electronic device is a behind-the-ear (BTE) component having an external coil attached thereto via a cable assembly, and wherein the inductive charging case includes one or more openings configured to enable the cable assembly to pass from an interior of the inductive charging case to outside of the inductive charging case while attached to the BTE component when the BTE component is positioned in the device recess.

19. The inductive charging case of claim 14, wherein the positioning arrangement comprises a ferromagnetic metal configured to magnetically attract to a magnet disposed in the electronic device.

20. The inductive charging case of claim 14, further comprising a transparent window arranged for visibility of one or more status indicators of the electronic device from outside of the inductive charging case when the lid is closed.

21. The inductive charging case of claim 14, further comprising an inductive charging coil positioned in the lid.

22. The inductive charging case of claim 14, further comprising:

a fan configured to draw air from outside of the inductive charging case into an interior of the inductive charging case and to expel air from the interior of the inductive charging case to outside of the inductive charging case.

23. The inductive charging case of claim 14, wherein the hinge mechanism is a spring-loaded hinge mechanism configured to self-close the lid.

24. The inductive charging case of claims 23, wherein the hinge mechanism comprises a damper configured to soft-close the lid.

25. A method for inductively charging a sound processing unit of an auditory prosthesis with an inductive charging case comprising a base and a lid attached to the base via hinge mechanism, the method comprising:

detaching the sound processing unit from a head of a recipient of the auditory prosthesis, wherein the sound processing unit comprises a skin-facing surface and an outer-facing surface;

placing the sound processing unit in a moveable support member of the inductive charging case with the skin-facing surface facing a bottom surface of the base, wherein one or more springs of the inductive charging case are attached to the bottom surface of the base and the moveable support member to support the moveable support member within the inductive charging case; and closing the lid to enclose the sound processing unit inside the inductive charging case such that the one or more springs urge the sound processing unit toward the lid.

26. The method of claim 25, wherein the inductive charging case comprises an insert having a profiled device recess, and wherein placing the sound processing unit in the moveable support member of the inductive charging case comprises:

placing the sound processing unit in the profiled device recess.

27. The method of claim 26, wherein the profiled device recess comprises a central region having a shape corresponding to a shape of the sound processing unit and one or more finger scoops adjacent to, and extending from, the central region, and wherein the method further comprises:

opening the lid; and removing the sound processing unit from the central region through use of the one or more finger scoops.

28. The method of claim 26, wherein the sound processing unit comprises an off-the-ear (OTE) sound processing unit, and wherein the method comprises:

placing an entirety of the OTE sound processing unit in the profiled device recess.

29. The method of claim 26, wherein the sound processing unit comprises a behind-the-ear (BTE) sound processing unit attached to an external coil via a cable assembly, and wherein the method comprises:

placing the BTE sound processing unit in the profiled device recess while the external coil remains outside of the inductive charging case, wherein the inductive charging case includes one or more openings to enable the cable assembly to pass from an interior of the inductive charging case to outside of the inductive charging case.

30. The method of claim 26, wherein the sound processing unit comprises a behind-the-ear (BTE) sound processing unit attached to an external coil via a cable assembly, and wherein the method comprises:

placing the BTE sound processing unit in the profiled device recess; and placing the external coil in a coil recess while the external coil remains outside of the inductive charging case, wherein the inductive charging case includes one or more openings to enable the cable assembly to pass from an interior of the inductive charging case to outside of the inductive charging case.

* * * * *